United States Patent

Moroto et al.

[11] Patent Number: 5,263,419
[45] Date of Patent: Nov. 23, 1993

[54] VEHICLE WITH NONCONTACT DRIVE MECHANISM AND TRANSPORTATION SYSTEM USING THE SAME

[75] Inventors: Shuzo Moroto, Nagoya; Masao Kawai, Tokyo; Hideki Aruga, Ichikawa; Toshihiro Shiimado, Tokyo; Yoshihisa Ito, Negishi; Koji Hori, Chiba, all of Japan

[73] Assignee: Aisin AW Co., Ltd., Japan

[21] Appl. No.: 740,837

[22] Filed: Aug. 7, 1991

[30] Foreign Application Priority Data

Jan. 11, 1991 [JP] Japan ................................ 3-002259

[51] Int. Cl.$^5$ ............................................. B62D 57/04
[52] U.S. Cl. ................................... 104/290; 104/243; 310/67 R
[58] Field of Search ............... 104/242, 243, 282, 292, 104/288, 289, 290; 310/105, 67 R, 313; 296/180.1, 180.3; 180/65.5

[56] References Cited

U.S. PATENT DOCUMENTS

| | | | |
|---|---|---|---|
| 776,826 | 12/1904 | Caldwell | 104/292 X |
| 3,326,318 | 6/1967 | Bevoise | 296/180.5 X |
| 3,847,089 | 11/1974 | Nelson | 104/292 X |
| 3,903,808 | 9/1975 | Foldes | 104/288 |
| 4,022,403 | 5/1977 | Chiquet | 104/23.1 X |
| 5,067,932 | 11/1991 | Edwards | 180/65.5 X |

FOREIGN PATENT DOCUMENTS

| | | | |
|---|---|---|---|
| 104443 | 10/1926 | Fed. Rep. of Germany | 180/65.5 |
| 3428684 | 6/1986 | Fed. Rep. of Germany | 104/290 |
| 3841011 | 6/1990 | Fed. Rep. of Germany | 104/290 |

Primary Examiner—Robert J. Oberleitner
Assistant Examiner—Kevin D. Rutherford
Attorney, Agent, or Firm—Lorusso & Loud

[57] ABSTRACT

A vehicle with a noncontact drive mechanism includes a magnetic propelling device 7 for generating a propelling force derived from magnetic induction of an eddy current within a reaction plate 4 laid on a road surface, without contact between the magnetic propelling device and the reaction plate; a flux changing device 13 for changing magnetic flux of the magnetic propelling device; a chassis supporting device for holding a chassis with respect to the road surface; and running-direction control devices 3, 5 for controlling the direction of running of the vehicle. The vehicle is adapted to run by generating a magnetic force in noncontact with the reaction plate. The vehicle further includes a plurality of wheels 2 for supporting the chassis on the road surface and a wheel drive device for driving at least one of the wheels, so as to permit running by making use of magnetic propelling force in noncontact with the reaction plate and by making use of a frictional force through friction between the road surface and the wheels. The vehicle is capable of running on any road surface so as to enhance the degree of its freedom, and is capable of reducing tire wear. Also disclosed is a transportation system using the vehicle.

21 Claims, 31 Drawing Sheets

ROAD SURFACE

VEHICLE WITH NONCONTACT DRIVE MECHANISM AND TRANSPORTATION SYSTEM USING THE SAME

BACKGROUND OF THE INVENTION

1. Field of the Invention

The present invention relates to a vehicle with a noncontact drive mechanism capable of noncontact drive for propelling the vehicle in a state of noncontact with a road surface and contact drive for propelling the same by means of frictional drive in contact with the road surface, and more particularly to a vehicle with a noncontact drive mechanism using a propelling force derived from magnetic induction as noncontact drive.

2. Description of the Related Art

Conventionally, in the case of a vehicle such as an automobile for running on a road surface, the chassis is directly supported on the road via tires. Accordingly, with such a vehicle, since the tires are brought into contact with the road surface and power transmission is effected through friction between the tires and the road surface, the vehicle is adapted to run by means of contact drive between the tires and the road surface. With such a vehicle, the wheels can be steered and a driving system is mounted on the chassis, so that the vehicle can run almost anywhere and, therefore, the degree of its freedom is very large.

In general, roads include not only paved and unpaved roads but also roads with differing conditions, such as frozen roads, snowy roads, sandy roads, and muddy roads. Since the conditions of the surface of these roads, including the coefficient of friction, $\mu$, vary, the operationability of the conventional vehicle running on the road surface through contact drive, as described above, is much dependent on the road surface conditions. For instance, in the case of the road surface having a low coefficient of friction (low $\mu$ road) as in the case of a frozen road, there are cases where the tires undergo slippage, thereby making it impossible to perform frictional drive efficiently. In addition, it becomes impossible to run the vehicle depending on the condition of the road surface, and there are cases where the degree of freedom for a vehicle running on the road surface is restricted.

In addition, even on a road having a relatively high coefficient of friction, in the case of super-high-speed running, there are problems in that the tires undergo slippage, with the result that it is not only impossible to perform frictional drive efficiently, but also the slippage makes the wear of the tires more intense.

Furthermore, if an attempt is made to make possible running on a low $\mu$ road and running through noncontact drive, problems are encountered in cornering and straight line stability.

SUMMARY OF THE INVENTION

In view of the above-described circumstances, it is an object of the present invention to provide a vehicle with a noncontact drive mechanism which permits running on any road surface and is capable of enhancing the degree of freedom and of reducing tire wear, as well as a transportation system using the same.

To this end, in accordance with a first aspect of the present invention, there is provided a vehicle with a noncontact drive mechanism, comprising: magnetic propelling means for generating a propelling force derived from magnetic induction by cooperating with a reaction plate laid on a road surface, in a state of noncontact with the reaction plate; driving-force generating means for changing magnetic flux of the magnetic propelling means; chassis support means for supporting a chassis with respect to the road surface; and running-direction control means for controlling the direction of running of the vehicle. In accordance with a second aspect of the invention, the vehicle may further comprise: a predetermined number of wheels for supporting the chassis on the road surface; and second driving-force generating means for driving at least one of the wheels, wherein running by making use of a propelling force in noncontact with the reaction plate and running by making use of a frictional force through friction between the road surface and the wheels are made possible.

It is preferred that the magnetic propelling means is a rotary magnet, that the driving-force generating means is means for rotatively driving the rotary magnet, and that the driving-force generating means is an electric motor. In addition, it is preferred that the rotary magnet is a rotor of the electric motor, that the driving-force generating means is an engine, that the magnetic propelling generating means is comprised of a fixed magnet mounted on the chassis, and that the driving-force generating means is means for changing the magnetic flux of the fixed magnet by control of supply of current to the fixed magnet.

The vehicle may further comprise additional propelling-force generating means, and the additional propelling-force generating means may be a propeller or a screw.

It is preferred that the chassis supporting means is floating means for floating the chassis above the road surface by means of air or magnetic force. Preferably, the chassis supporting means is a carriage roller for supporting the chassis on a carrying rail laid on the road surface or is a plurality of wheels for supporting the chassis on the road surface.

The running-direction control means may be a guide roller abutting against a guide laid on the road surface or a rudder constituted by a wing mounted on the chassis, and may make use of a reactionary force acting on the magnetic propelling means when the direction of running deviates from a proper course.

The first driving-force generating means is preferably an electric motor, or the second driving-force generating means is the electric motor constituting the first driving-force generating means, the rotary magnet and the wheels being rotatively driven by the electric motor. The rotary magnet may be a rotor of the electric motor.

In addition, the first driving-force generating means may be an engine, or the second driving-force generating means may be the engine constituting the first driving-force generating means, the rotary magnet and the wheels being rotatively driven by the engine. The rotary magnet may be disposed integrally with the wheel.

In accordance with a third aspect of the invention, there is provided a transportation system using a vehicle with a noncontact drive mechanism, comprising: a reaction plate laid on a road surface; and a vehicle with a noncontact drive mechanism including at least magnetic propelling means for generating a propelling force by means of magnetic induction by cooperating with the reaction plate in a state of noncontact therewith, chassis supporting means for holding a chassis with respect to the road surface, and running-direction control means for controlling the direction of running of the vehicle, the vehicle being adapted to run by means of the propelling force acting between the reaction plate and the magnetic propelling means.

It is preferred that the reaction plate be divided into parallel tracks, and that the running-direction control means be constituted by a guide roller, and that a guide against which the guide roller abuts be laid on the road surface. In addition, the chassis supporting means may be constituted by a carriage roller, and a carrying rail on which the carriage roller travels may be laid on the road surface.

As described above, the vehicle according to the first aspect of the invention comprises: magnetic means for generating a propelling force derived from magnetic induction by cooperating with a reaction plate laid on a road surface in a state of noncontact with the reaction plate; driving-force generating means for changing magnetic flux of the propelling-force generating means, chassis holding means for supporting a chassis on a road with respect to the road surface; and running-direction control means for controlling the direction of running of the vehicle. Therefore, the vehicle is capable of running by means of propelling drive in noncontact with the reaction plate without resorting to frictional drive. Hence, it is possible to obtain a large driving force even on the surface of a low $\mu$ road, and if reaction plates are laid on the road surface, it is possible to effect positive and stable running on any road surface without being affected by the road surface environment. In addition, since the running of the vehicle is not based on the frictional drive through friction between the wheels and the road surface, even if wheels are adopted as a means of holding the chassis on the road surface, the wheels practically do not undergo wear.

In addition, as described above, the vehicle in accordance with the second aspect of the invention comprises: magnetic propelling means for generating a propelling force derived from magnetic induction by cooperating with a reaction plate laid on a road surface in a state of noncontact with the reaction plate; first driving-force generating means for changing magnetic flux of the magnetic propelling means by driving the propelling-force generating means; chassis supporting means for holding a chassis with respect to the road surface; and running-direction control means for controlling the direction of running of the vehicle; a plurality of wheels for holding the chassis on the road surface; and second driving-force generating means for driving at least one of the wheels. Accordingly, the vehicle is capable of running by frictional drive through friction between the wheels and the road surface and of running by propelling drive in noncontact with the road surface. Hence, it is possible to obtain a large driving force even on the surface of a low $\mu$ road or the like. The vehicle is capable of running positively and stably on any road surface with the reaction plates without being affected by the road surface environment, and of running even on a road surface without the reaction plates.

Furthermore, since the propelling-force generating means is comprised of the rotary magnet, and the rotary magnet is comprised of the rotor of the electric motor for driving the rotary magnet, the driving devices of the vehicle can be made compact in size.

In addition, the magnetic propelling means is comprised of a fixed magnet mounted on the chassis, and the driving-force generating means is means for changing the magnetic flux of the fixed magnet by control of supply of current to the fixed magnet. Accordingly, by simply controlling the of current to the fixed magnets, it is possible to obtain the noncontact propelling force, making it possible to make the driving device further compact.

Moreover, the second driving-force generating means is comprised of an electric motor or engine constituting the first driving-force generating means, and since the rotary magnets and the wheels are rotated by the electric motors or the engine, the vehicle can be made compact in size.

In a transportation system using the vehicle with a noncontact drive mechanism, as described above, the transportation system comprises: a reaction plate laid on a road surface; and a vehicle with a noncontact drive mechanism including at least magnetic propelling means for generating a propelling force by means of magnetic induction by cooperating with the reaction plate in a state of noncontact therewith, chassis supporting means for holding a chassis with respect to the road surface, and running-direction control means for controlling the direction of running of the vehicle, the vehicle being adapted to run by means of the propelling force acting between the reaction plate and the magnetic force means. Accordingly, it is possible to realize a transportation system in which the vehicle is capable of running positively and stably on any road surface without being affected by the road surface condition, with relatively simple facilities involving the laying of reaction plates and a guide and carrying rails for controlling the running direction. In addition, since running is based on noncontact drive, it is possible to effect high speed running.

The above and other objects, features and advantages of the present invention will become more apparent from the following detailed description of the invention when read in conjunction with the accompanying drawings.

BRIEF DESCRIPTION OF THE DRAWINGS

FIG. 50(b) is a side elevational view of same; FIG. 50(c) is a rear or front view of same; FIG. 50(d) is a sectional view taken along line I—I in FIG. 50(a); FIG. 50(e) is a sectional view taken along line II—II in FIG. 50(a); and FIG. 50(f) is a sectional view taken along line III—III in FIG. 50(a).

DESCRIPTION OF THE PREFERRED EMBODIMENTS

Referring now to the accompanying drawings, a description will be given of the embodiments of the present invention.

Figure 1:
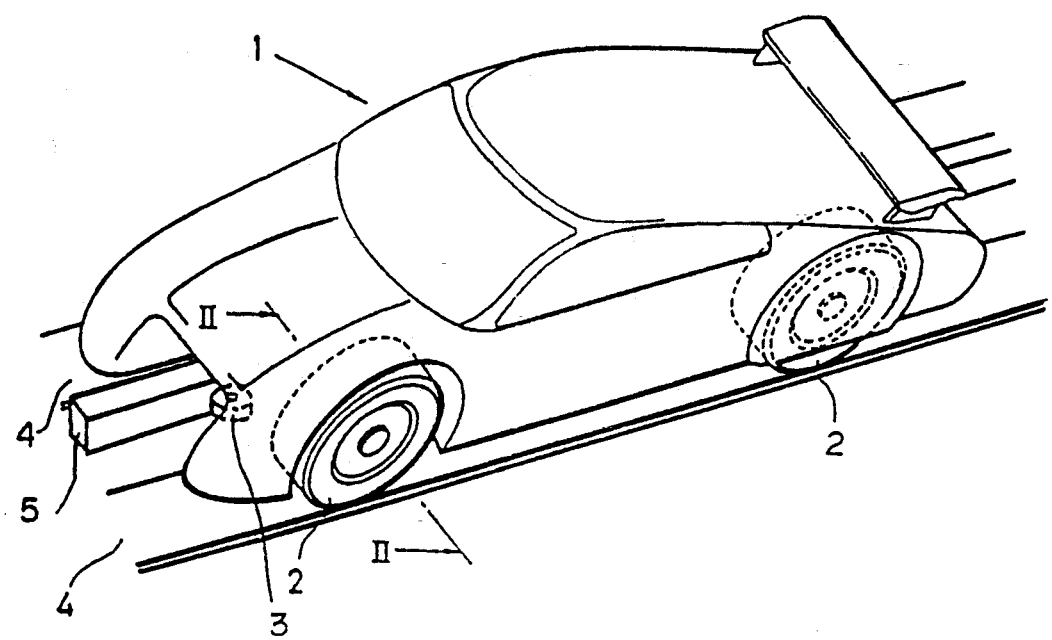
FIG. 1 is a perspective view illustrating an embodiment of a vehicle based on noncontact drive and frictional drive in accordance with the present invention.
Figure 2:
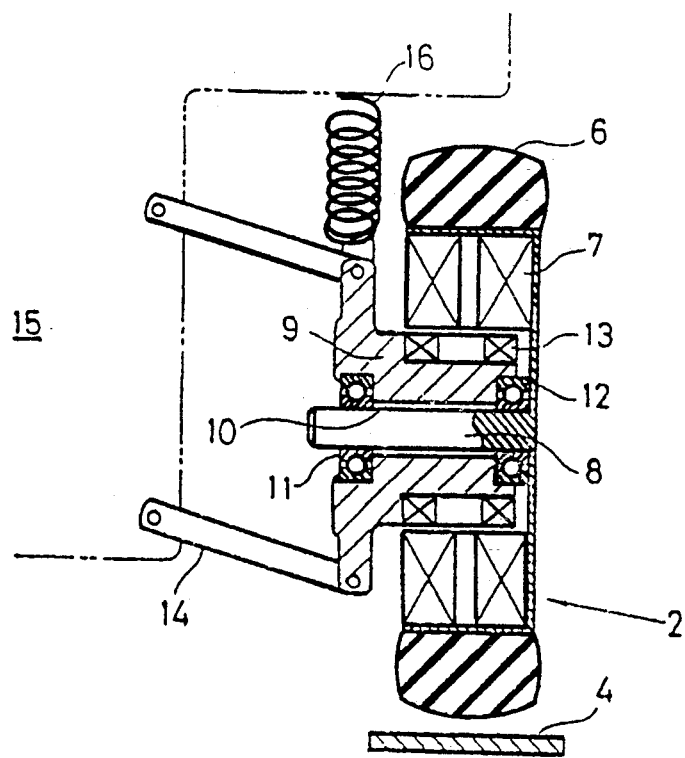
FIG. 2 is a cross-sectional view taken along line II—II of FIG. 1.
Figure 3:
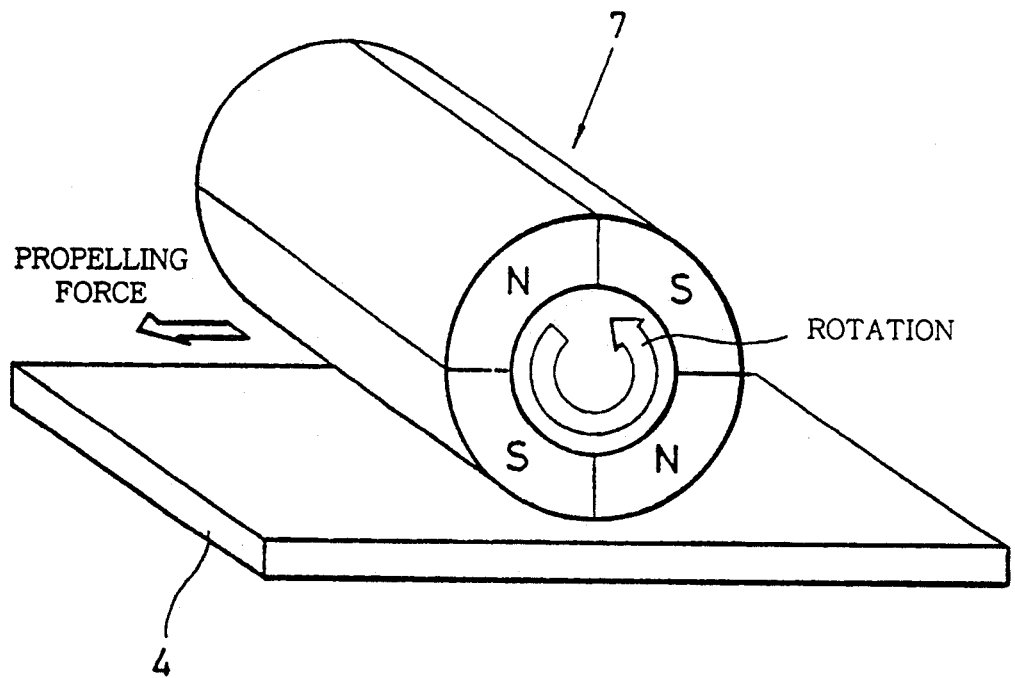
FIG. 3 is a diagram illustrating an example of arrangement of a secondary-side rotary magnet.

FIG. 1 is a perspective view illustrating an embodiment of a vehicle based on noncontact drive and frictional drive in accordance with the present invention; FIG. 2 is a cross-sectional view taken along line II—II of FIG. 1; and FIG. 3 is a diagram illustrating an example of arrangement of a secondary-side rotary magnet.

A vehicle 1 shown in FIG. 1, such as an automobile, comprises wheels 2 (only the left-hand wheels are shown) including a pair of front wheels and a pair of rear wheels, each arranged on left- and right-hand sides of the vehicle, and guide rollers 3. The vehicle 1 is adapted to run by producing a propelling force between a pair of left- and right-hand reaction plates 4 on the one hand, and the wheels 2 on the other, along a guide 5 laid on a road surface R. The vehicle 1 is, of course, capable of running on conventional roads at large where the reaction plates 4 and the guide 5 are not laid, by means of frictional drive using the wheels 2 in the same way as a conventional vehicle. In this case, at least one of the two pairs of the front and rear wheels 2 are made steerable.

First, a description will be given of the structure of the wheels 2. It should be noted that since the respective wheels have the same arrangement, a description will be given of the left-hand front wheel with reference to FIG. 2 showing a cross-sectional view taken along line II—II of FIG. 1, and a description of the other wheels will be omitted.

The wheel 2 is arranged with a tire 6 disposed around its outer periphery and a secondary-side rotary magnet 7 disposed radially inward of the tire 6 around and a rotating shaft 8 as shown in FIG. 2. The secondary-side rotary magnet 7 is constituted by a superconductive magnet formed of a superconductive coil and, for instance, two N poles and two S poles are arranged alternately around the circumference, as shown in FIG. 3.

The rotating shaft 8 is rotatably supported in an inner hole 10 of a cylindrical axle 9 by a pair of rotating supports 11, 12 for instance, bearings. Disposed around the outer periphery of the axle 9 is a primary-side fixed armature 13 facing the inner peripheral surface of the secondary-side rotary magnet 7. The primary-side fixed armature 13 and the secondary-side rotary magnet 7 constitute a wheel-driving motor using the secondary-side rotary magnet 7 as a rotor, i.e., a second driving-force generating means in accordance with the present invention.

The axle 9 is supported on a chassis 15 by means of a double wish-bone type link 14, and shocks are absorbed and alleviated by a coil spring 16 and a damper (not shown). As the method of supporting the axle 9 on the chassis 15, it is possible to adopt another suspension system.

As described above, since the wheel driving motor is comprised of the primary-side fixed armature 13 and the secondary-side rotary magnet 7, the wheel 2 can be rotated by supplying electric current to the primary-side fixed armature 13 and by controlling the supply current. Accordingly, the vehicle 1 equipped with the above-described wheels 2 can run on conventional roads by making use of frictional force acting between the tires 6 and the road surface in the same way as a conventional automobile by means of the rotative drive of the wheel driving motors. In addition, on a road where the reaction plates 4 are laid as shown in FIG. 1, the vehicle 1 is capable of running by making use of the frictional force between the tires 6 and the reaction plates 4 as well as running by making use of the propelling force derived from magnetic induction occurring in the reaction plates 4 through the rotation of the secondary-side rotary magnets 7. That is, the vehicle 1 is capable of running by contact drive based on the frictional force and by noncontact drive based on the propelling force derived from magnetic induction. In addition, in the case of noncontact drive based on the propelling force derived from magnetic induction with the wheels 2 floating (spaced from) the reaction plates 4, the vehicle 1 runs along the guide 5 laid on the road by means of the guide rollers 3 disposed on the vehicle 1.

The principle of propelling drive based on the above-described magnetic induction is as follows: As shown in FIG. 3, the secondary-side rotary magnet 7 functions as a primary-side magnet with respect to the reaction plate 4. Since the rotation of the secondary-side rotary magnet 7 causes a change in the magnetic flux which is interlinked with the reaction plate 4, magnetic induction occurs in the reaction plate 4 due to eddy currents, so that a propelling force is generated between the magnet 7 and the reaction plate 4.

Recently, oxide superconductive materials, which are capable of allowing very large current to flow therethrough even if an intense magnetic field is applied thereto, have been developed. If such an oxide superconductive material is used as the secondary-side rotary magnet 7, it is possible to obtain a large propelling force. As a result, it becomes possible to apply the propelling force derived from magnetic induction to a vehicle for running magnetic induction road surface, such as an automobile, which requires a large propelling force.

As described above, in accordance with the present invention, the magnetic induction propelling-force is provided by the secondary-side rotary magnet 7, and the first driving-force generating means is the motor for the wheel 2 which is constituted by the primary-side fixed armature 13 and the secondary-side rotary magnet 7. Accordingly, in the case of this embodiment, the first driving-force generating means for driving by magnetic induction in the reaction plate 4 and the second driving-force generating means for driving the wheel 2 are both disposed in the tire 6.

Thus, in accordance with the present invention, since the propelling force is produced between the secondary-side rotary magnet 7 and the reaction plate 4 by magnetic induction, even in cases where the tires 6 slip on a road surface having a low coefficient of friction (low μ road surface), such as a frozen road surface, and frictional running is impossible, the vehicle 1 can be propelled by the propelling force derived from magnetic induction. Moreover, in that case, since the secondary-side rotary magnet 7 which is the rotor for the motor for the wheel 2 is also used to generate propelling-force based on magnetic induction, the number of component parts used is small, and the structure can be made compact.

In the case of the embodiment shown in FIG. 2, the magnetic flux of the secondary-side rotary magnet 7 with respect to the reaction plate 4 is changed by mechanically rotating the secondary-side rotary magnet 7. Other examples of the means of mechanically changing the magnetic flux will be described hereinafter. It should be noted that those constituent elements that are identical with those of the foregoing embodiment will be denoted by the same reference numerals, and a description thereof will be omitted.

FIGS. 4 to 11 are diagrams illustrating other embodiments of the present invention for mechanically changing the magnetic flux of the secondary-side rotary magnet 7 with respect to the reaction plate 4.

Figure 4:
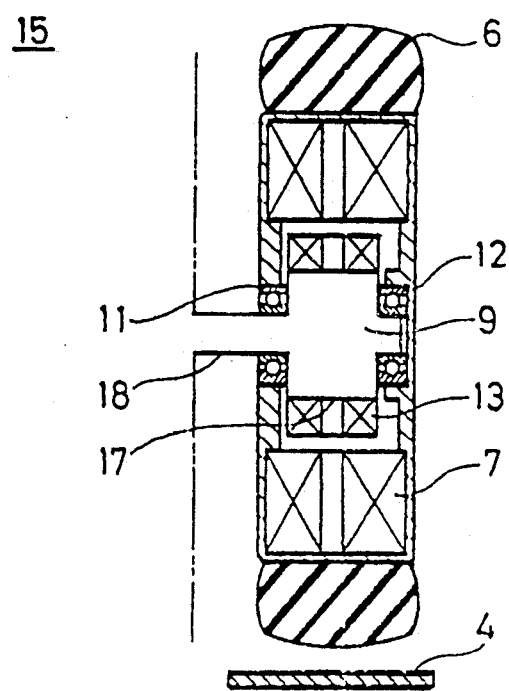
FIGS. 4 to 11 are diagrams illustrating other embodiments of the present invention for mechanically changing the magnetic flux of a secondary-side rotary magnet 7 with respect to the reaction plate 4.

In the embodiment shown in FIG. 4, the axle 9 is formed of a solid member comprised of a large-diameter portion 17 and a small-diameter portion, and the primary-side fixed armature 13 is disposed around the outer periphery of the large-diameter portion 17. The tire 6 and the secondary-side rotary magnet 7 are rotatably supported around the outer periphery of the small-diameter portion 18 via the rotating supports 11, 12. This axle is also supported on the chassis 15 by an appropriate known suspension. Since the operation of this embodiment is the same as that of the above-described embodiment, a description thereof will be omitted.

Figure 5:
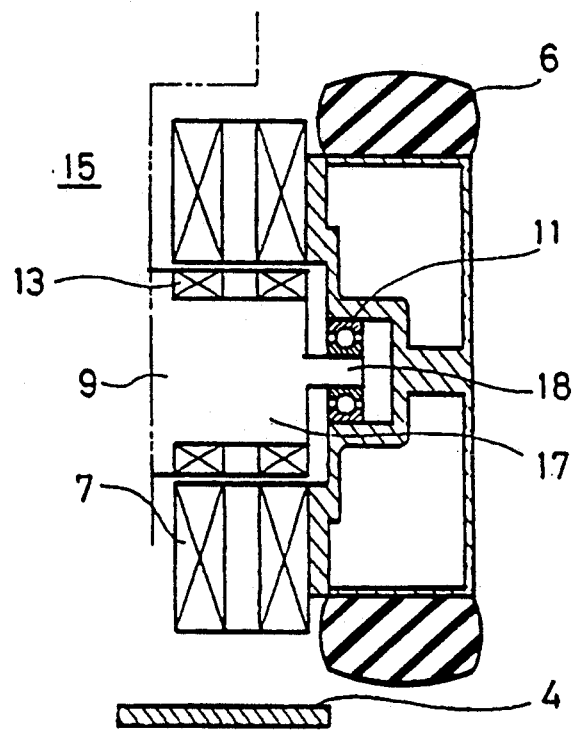

In the embodiment shown in FIG. 5, the secondary-side rotary magnet 7 of the wheel 2 is disposed not on the inner peripheral side of the tire 6 but to the side of (laterally of) the tire 6. As for the axle 9, a portion thereof radially inward of the tire 6 is small-diameter portion 18, and the remaining portion is the large-diameter portion 17. The primary-side fixed armature 13 is disposed around the large-diameter portion 17 in face-to-face relationship with the secondary side rotary magnet 7, while the tire 6 is rotatably supported on the small-diameter portion 18 via the rotating support 11. Accordingly, the vehicle 1 has secondary-side rotary magnets 7 opposed to (facing) the tertiary-side reaction plates 4 laid on the road surface. The contact drive derived from the frictional force in this case is performed through the frictional force acting between the tires 6 and the road surface. In this embodiment, the first and second driving-force generating means and the propelling-force generating means are disposed integrally outside the tire 6. In this embodiment as well, since the manner of supporting the axle 9 and operation are the same as those of the previously described embodiments, a description thereof will be omitted.

Figure 6:
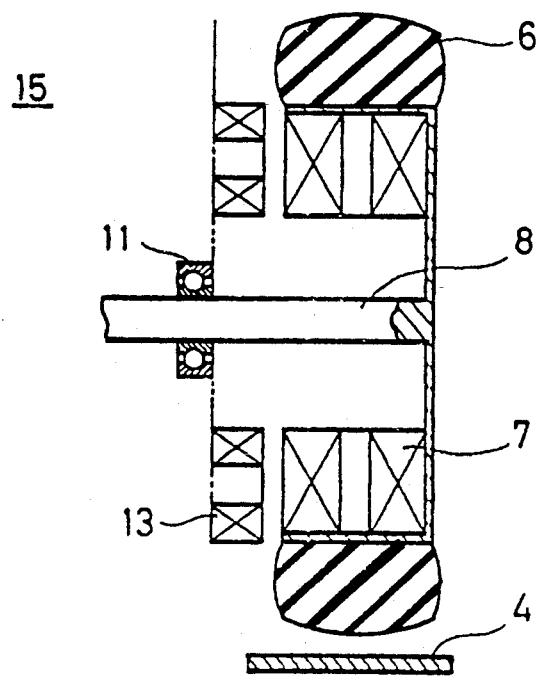

In the embodiment shown in FIG. 6, the secondary-side rotary magnet 7 is disposed radially inward of the tire 6, and the primary-side fixed armature 13 is disposed on the chassis 15 in face-to-face relationship with the secondary-side rotary magnet 7. The rotating shaft 8 of the wheel 2 is rotatably supported directly on the chassis 15 via the rotating support 11.

Figure 7:
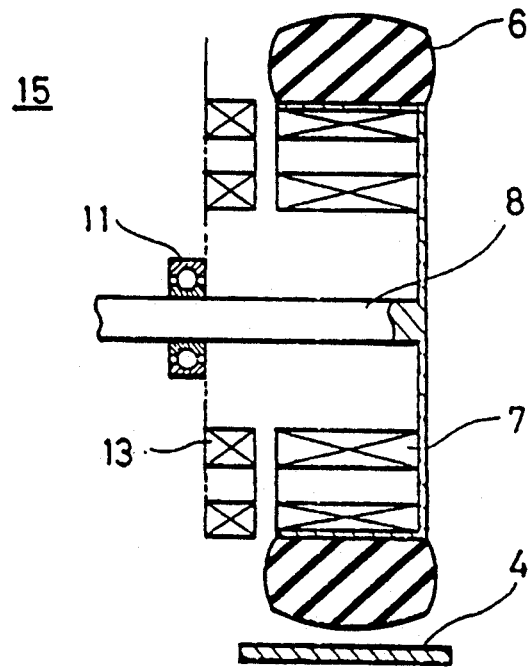

The embodiment shown in FIG. 7 is substantially similar to the embodiment shown in FIG. 6, only the winding direction of the coil of the secondary-side rotary magnet 7 differs.

Figure 8:
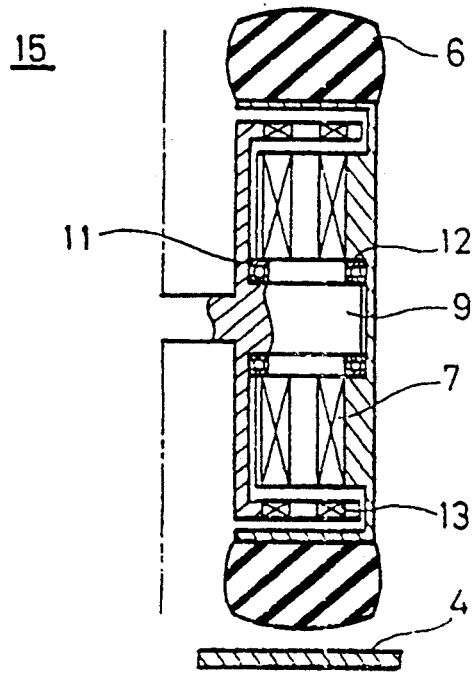

In the embodiment shown in FIG. 8, the secondary-side rotary magnet 7 is disposed radially inward of the tire 6, and the primary-side fixed armature 13 is mounted on the chassis 9 in such a manner as to be located between the secondary-side rotary magnet 7 and the tire 6. In addition, the secondary-side rotary magnet 7 and the tire 6 are rotatably supported on the axle 9 via a pair of rotating supports 11, 12.

Figure 9:
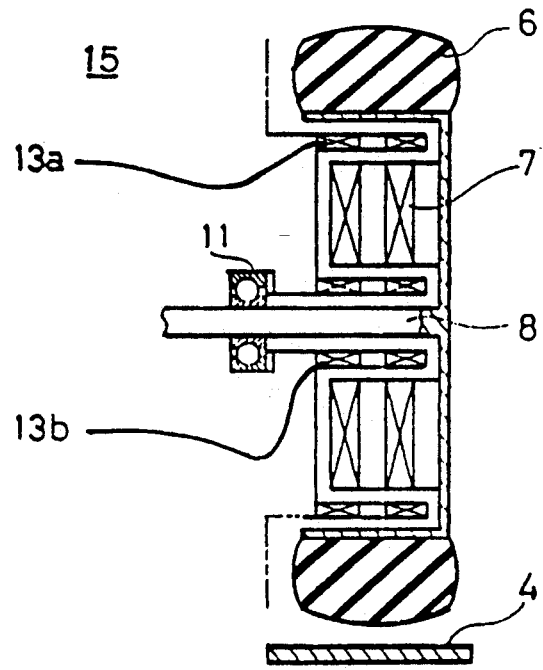

In the embodiment shown in FIG. 9, the secondary-side rotary magnet 7 is disposed radially inward of the tire 6, and the secondary-side rotary magnet 7 and the rotating shaft 8 of the tire 6 are supported on the chassis 15 via the rotating support 11. In addition, a pair of primary-side fixed armatures 13a, 13b are mounted on the chassis 15 between the secondary-side rotary magnet 7 and the tire 6 and between the secondary-side rotary magnet 7 and the rotating shaft 8, i.e., around both the outer and inner peripheries of the secondary-side rotary magnet 7.

Figure 10:
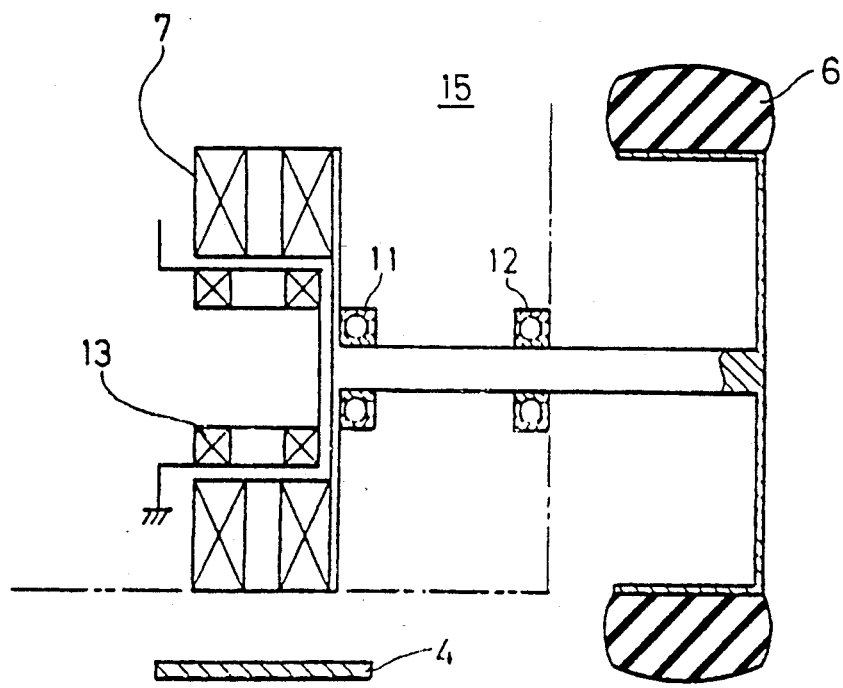

In the embodiment shown in FIG. 10, both the secondary-side rotary magnet 7 and the primary-side fixed armature 13 are disposed in the chassis 15. That is, the rotating shaft 8 at one end of which the tire 6 is attached is supported on the chassis by a pair of rotating supports 11, 12, and the secondary-side rotary magnet 7 is fixed to the other end of this rotating shaft 8. In addition, the primary-side fixed armature 13 is mounted on the chassis 15 radially inward of the secondary-side rotary magnet 7. In addition, the vehicle 1 allows the secondary-side rotary magnets 7 to be respectively opposed to the reaction plates 4. In this embodiment, the driving system (frictional drive through tire) and the propelling system (magnetic induction through plates 4) are disposed inside the chassis 15.

Figure 11:
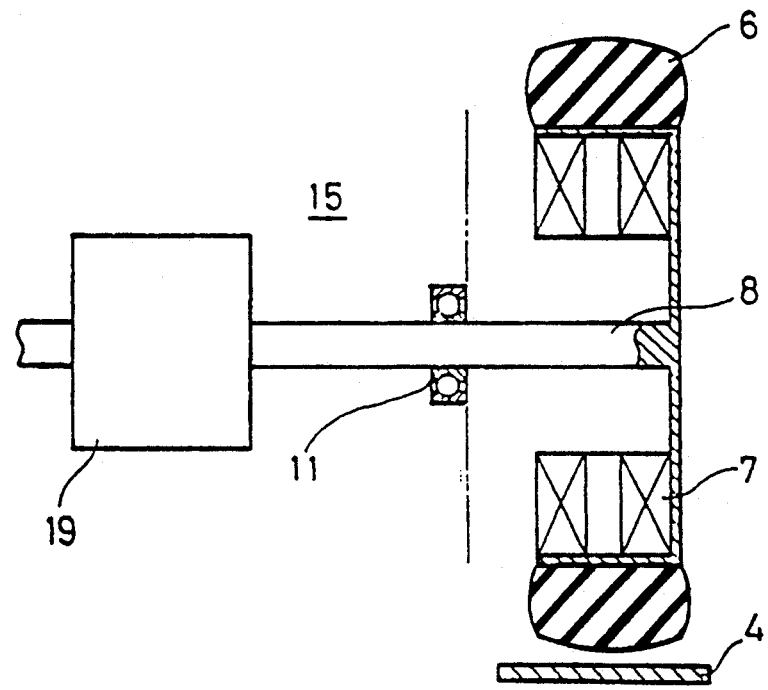

In the embodiment shown in FIG. 11, the secondary-side rotary magnet 7 (which is the primary side in this example) is disposed radially inward of the tire 6, and the rotating shaft 8 is supported on the chassis 15 by means of the rotating support 11. In addition, this rotating shaft 8 is connected to a power source 19 mounted on the chassis 15, such as an electric motor or an engine. Accordingly, the tires 6 and the secondary-side rotary magnets 7 are rotated by the power source 19, and the secondary-side rotary magnets 7 are used independently only for the purpose of noncontact propulsion. That is, in this embodiment, the first and second driving-force generating means and the propelling means are separate.

The foregoing embodiments are examples for mechanically changing the magnetic flux of the secondary-side rotary magnet 7 with respect to the reaction plate 4, and an arrangement may be alternatively provided such that the change in magnetic flux is effected electrically. Hereinafter, a description will be given of means for electrically changing the magnetic flux.

FIGS. 12 to 16 are diagrams illustrating embodiments of the present invention with means for electrically changing the magnetic flux of the secondary-side rotary magnet 7 with respect to the reaction plate 4.

Figure 12:
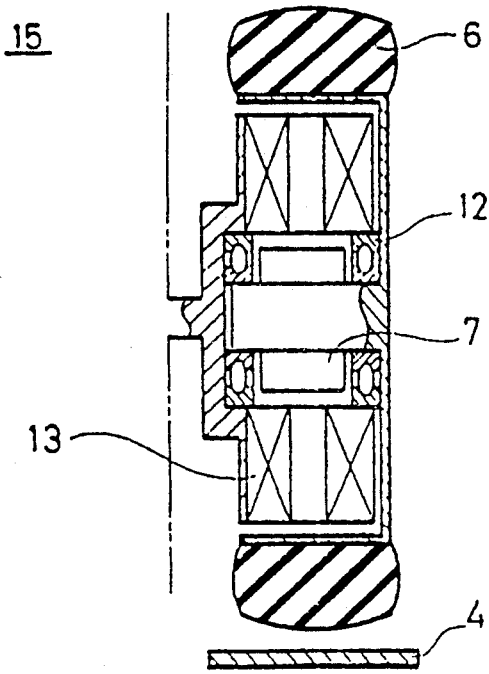
FIGS. 12 to 16 are diagrams illustrating embodiments of the present invention concerning means for electrically changing the magnetic flux of the secondary-side rotary magnet 7 with respect to the reaction plate 4.

In the embodiment shown in FIG. 12, the secondary-side rotary magnet 7 is disposed on the rotating shaft 8 radially inward of the tire 6, and is formed of an electromagnetic coil, a permanent magnet, a conductive material such as aluminum, or a superconductive magnet. In addition, the primary-side fixed armature 13 is attached to the chassis 15 in such a manner as to be located between the tire 6 and the secondary-side rotary magnet 7. This primary-side fixed armature 13 is formed of, for instance, an AC superconductive magnet. If an alternating current is supplied to the primary-side fixed armature 13, the magnetic poles rotate and a change takes place in the magnetic flux with respect to the reaction plate 4, so that a propelling force is generated between the primary-side fixed armature 13 and the reaction plate 4. Since the other operation is similar to that of the foregoing embodiments, a description thereof will be omitted.

Figure 13:
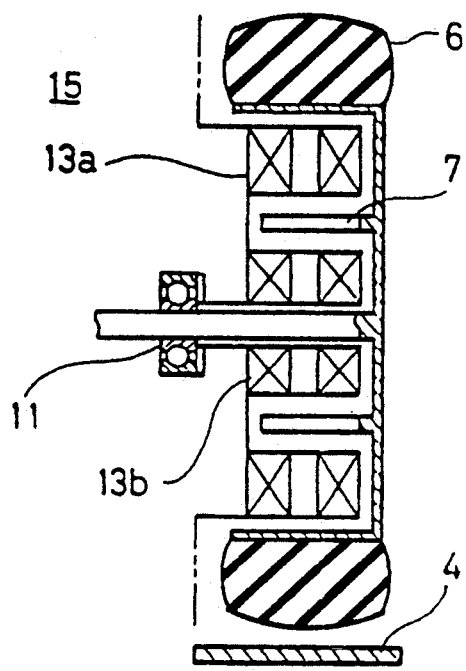

In contrast to the embodiment shown in FIG. 12, the embodiment shown in FIG. 13 is arranged such that the pair of primary-side fixed armatures 13a, 13b are disposed concentrically such that the primary-side fixed armature 13a surrounds the primary-side fixed armature 13b, and the secondary-side rotary magnet 7 is disposed between the pair of primary-side fixed armatures 13a, 13b. The primary-side fixed armature 13a on the outer side is formed of an AC superconductive magnet, and an alternating current is supplied to the primary-side fixed armature 13a so as to change the magnetic flux.

Figure 14:
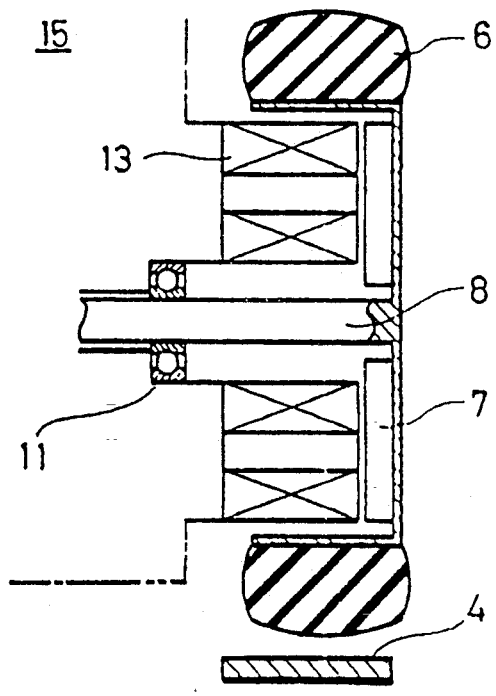

In the embodiment shown in FIG. 14, the winding direction of the coil of the superconductive magnet of the primary-side fixed armature 13 differs, and the secondary-side rotary magnet 7 is disposed facing the end surface of the primary-side fixed armature 13.

Figure 15:
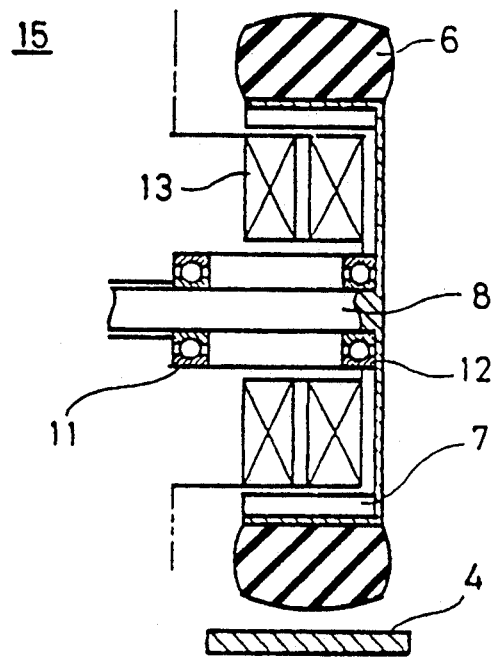

In the embodiment shown in FIG. 15, the secondary-side rotary magnet 7 is disposed on the outer peripheral side of the primary-side fixed armature 13, i.e., between the primary-side fixed armature 13 and the tire 6.

Figure 16:
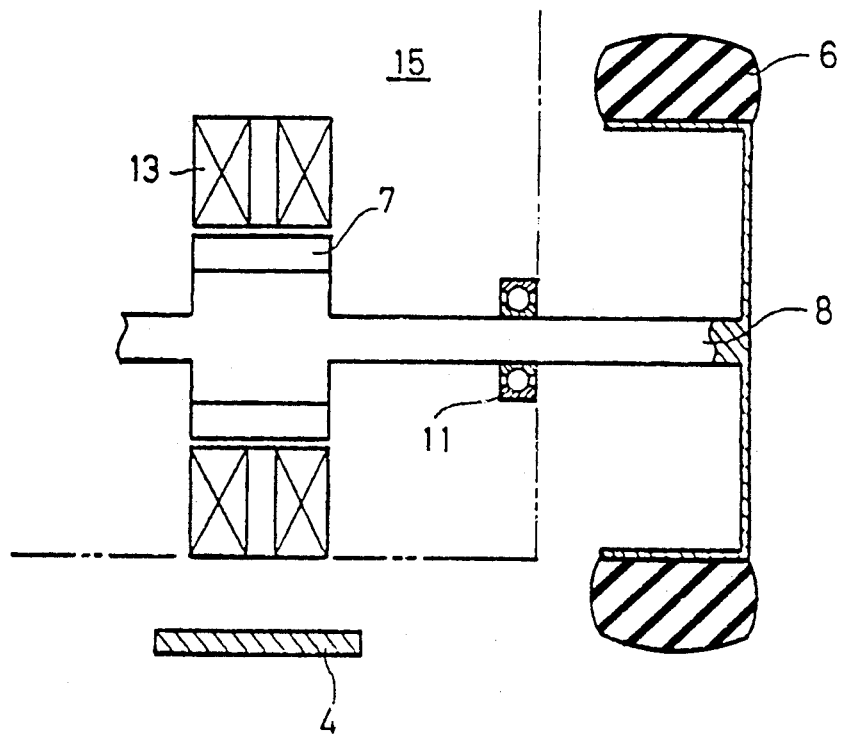

In the embodiment shown in FIG. 16, both the secondary-side rotary magnet 7 and the primary-side fixed armature 13 are disposed inside the chassis 15. That is, the rotating shaft 8 is supported on the chassis 15 by means of the rotating support 11, the tire 6 is fixed to one end of the rotating shaft 8, and the secondary-side rotary magnet 7 is fixed to the other end thereof. In addition, the primary-side fixed armature 13 is mounted on the chassis 15 in such a manner as to be located on the outer peripheral side of the secondary side rotary magnet 7.

In addition, in the embodiments shown in FIGS. 14 to 16, the primary-side fixed armature 13 is formed of an AC superconductive magnet, and an alternating current is supplied to the primary-side fixed armature 13 or 13b so as to change the magnetic flux.

Various other arrangements of the driving-force generating means and the propelling-force generating means are conceivable. A number of examples will be illustrated below.

First, a description will be given of embodiments in the case of a four-wheeled vehicle.

FIGS. 17 to 21 are diagrams illustrating examples of the arrangement pattern of the driving-force generating means and the propelling-force generating means in a four-wheeled vehicle.

Figure 17:
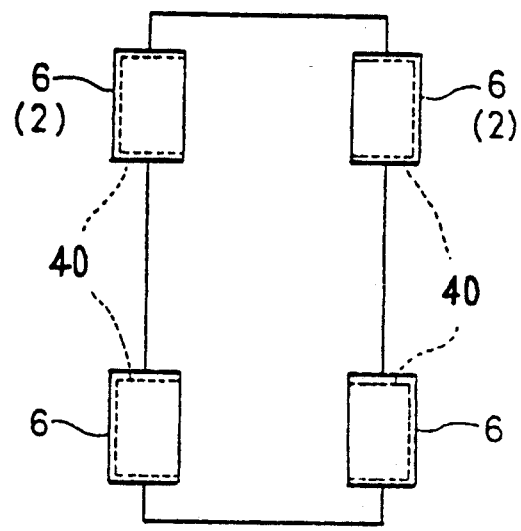
FIGS. 17 to 21 are diagrams illustrating examples of the arrangement pattern of a driving-force generating means and a propelling-force generating means in a four-wheeled vehicle.

In the embodiment shown in FIG. 17, four driving-force generating means are disposed in the respective tires 6, and the propelling-force generating means is disposed in at least one of the tires 6.

Figure 18:
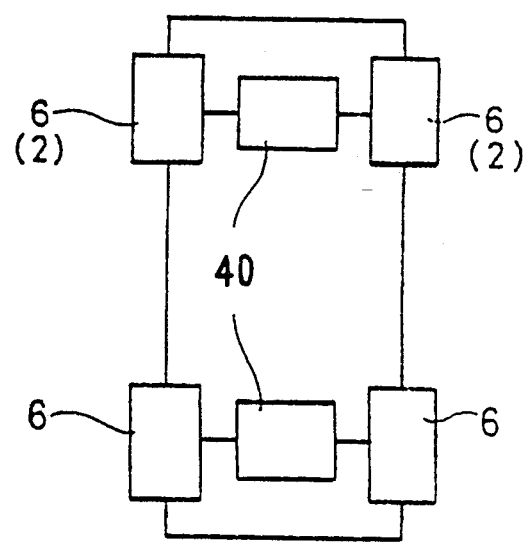

In the embodiment shown in FIG. 18, two driving-force generating means 40 are provided for the front and rear wheels, respectively, one driving-force generating means being used in common for the left- and right-hand wheels. In addition, the propelling-force generating means is disposed at at least one location of the four tires 6 and the two driving-force generating means.

Figure 19:
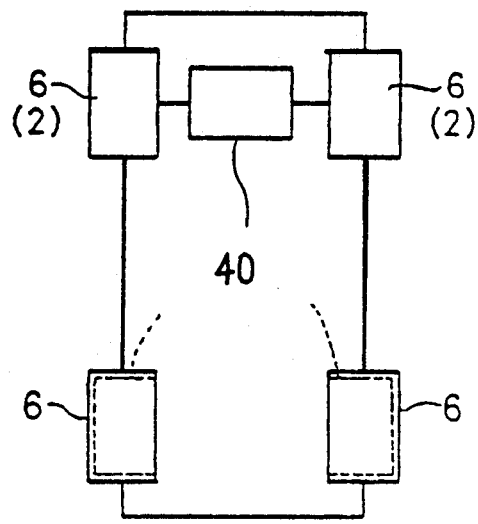
Figure 20:
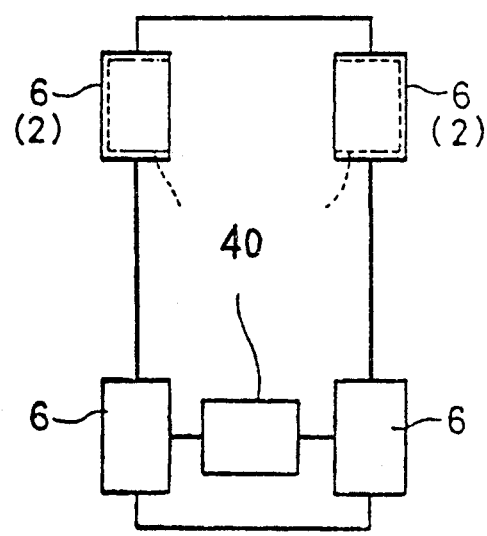

In the embodiment shown in FIG. 19, one driving-force generating means 40 is disposed in common for the front wheels 2, and two driving-force generating means are respectively disposed for the rear wheels 3, i.e., one for each rear wheel, a total of three driving-force generating means being provided. The propelling-force generating means is disposed at at least one location of the four tires 6. In the embodiment shown in FIG. 20, contrary to the case of FIG. 19, two driving-force generating means are disposed for the front wheels 2, i.e., one for each front wheel, and one driving-force generating means 40 is disposed in common for the rear wheels, a total of three driving-force generating means 40 being provided. The propelling-force generating means is disposed at at least one location of the four tires 6.

Figure 21:
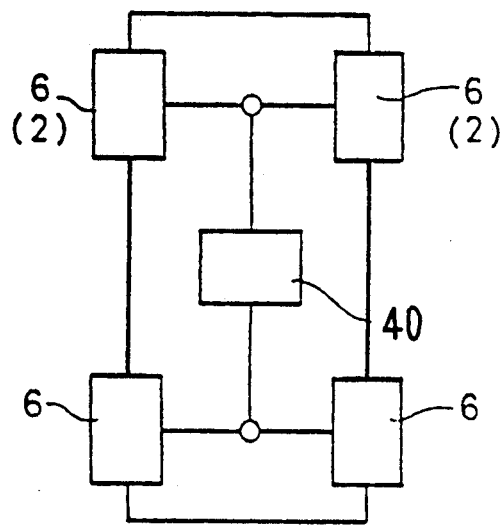

In the embodiment shown in FIG. 21, one driving-force generating means is disposed in common for the front wheels 2 and the rear wheels 3, and the propelling-force generating means is disposed at at least one location of the four tires 6.

Next, a description will be given of embodiments in the case of a three-wheeled vehicle.

Figure 22:
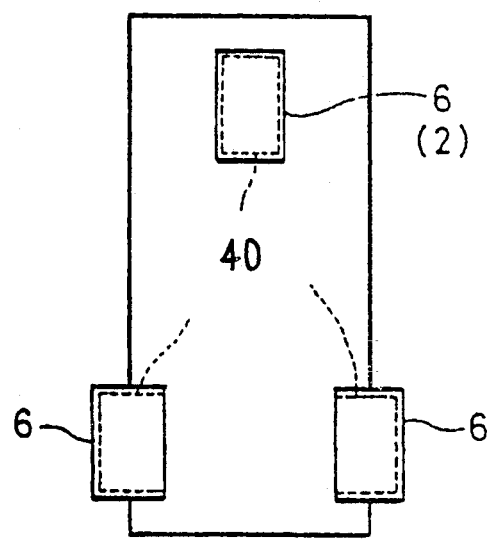
FIGS. 22 to 24 are diagrams illustrating examples of the arrangement pattern of the driving-force generating means and the propelling-force generating means in a three-wheeled vehicle.
Figure 23:
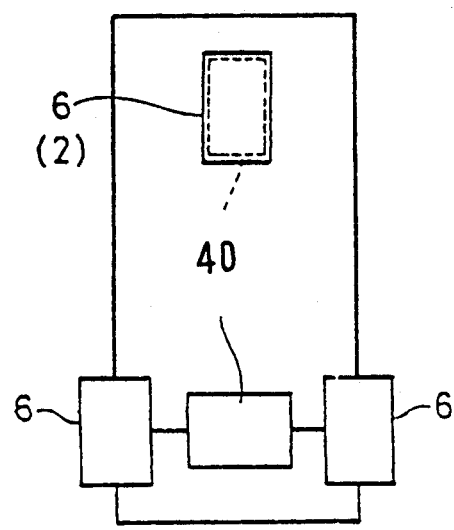
Figure 24:
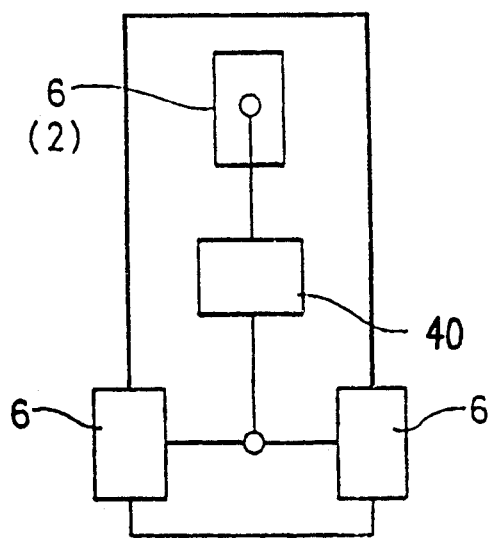

FIGS. 22 to 24 are diagrams illustrating examples of the arrangement of the driving-force generating means 40 and the propelling-force generating means in a three-wheeled vehicle.

In the embodiment shown in FIG. 22, three driving-force generating means are respectively disposed in the three tires 6, and at least one propelling-force generating means is disposed at at least one location of the tires 6.

In the embodiment shown in FIG. 23, one driving-force generating means is disposed in the tire 6 of the front wheel 2, another driving-force generating means 40 is disposed in common for the two rear wheels 3, and the propelling-force generating means is disposed at at least one location of the tires 6.

In the embodiment shown in FIG. 24, one driving-force generating means 40 is disposed in common for the front wheel 2 and the rear wheels 3, and the propelling-force generating means is disposed at at least one location of the tires 6.

The above-described embodiments are respectively comprised of combinations of the driving-force generating means based on friction and the noncontact propelling-force generating means based on magnetic induction, and an additional propelling-force generating means may be combined with these embodiments. Hereinafter, a description will be given of such embodiments.

FIGS. 25 to 28 are diagrams illustrating embodiments in which an additional propelling-force generating means is provided.

Figure 25:
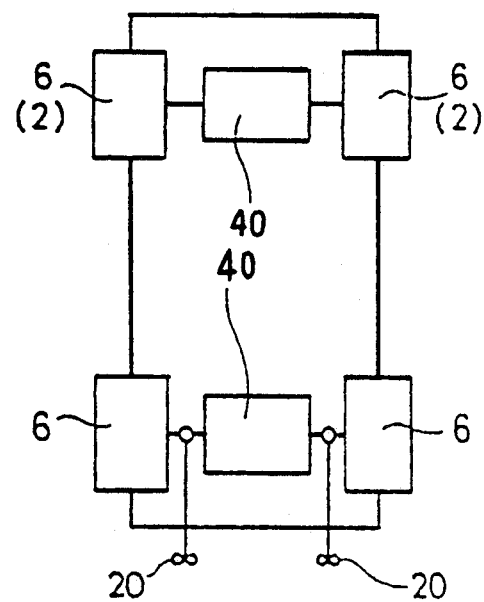
FIGS. 25 to 28 are diagrams illustrating embodiments in which an additional propelling-force generating means is combined.

In the embodiment shown in FIG. 25, two driving-force generating means 40 are disposed for the front and rear wheels 2, respectively, one driving-force generating means being used in common for the left- and right-hand wheels. In addition, the propelling-force generating means is disposed at at least one location of the four tires 6. A pair of propellers or screws 20 are driven by the driving-force generating means 40 of the rear wheels 3. These propellers or screws 20 are not restricted to a pair, and the number thereof may be one or more, as desired. A driving force is generated by the propeller, and the vehicle 1 effects frictional running via the tires 6 by means of this frictional force, or effects noncontact propulsion, floating as will be described later. Meanwhile, a propelling force is generated by the screw, and the vehicle 1 is propelled on water or in water by means of this propelling force. Accordingly, the propelling force derived from the propeller or screw 20 aids the propulsion of the vehicle 1.

Figure 26:
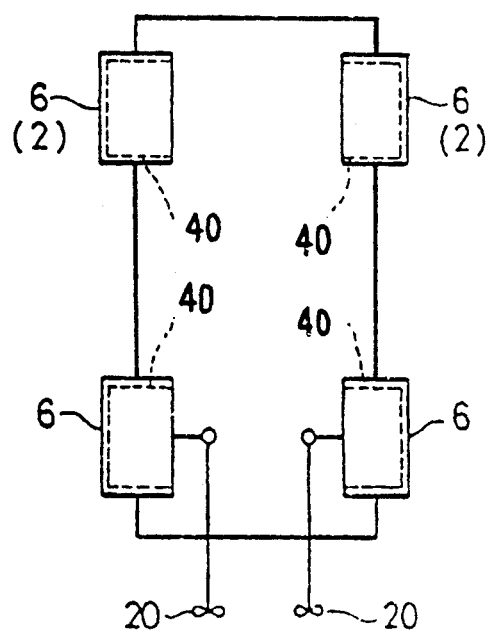

In the embodiment shown in FIG. 26, four driving-force generating means 40 are disposed in the respective tires 6, and the propelling-force generating means is disposed in at least one of the tires 6. Furthermore, the pair of propellers or screws 20 are driven by the left- and right-hand driving-force generating means of the rear wheels 3, respectively.

Figure 27:
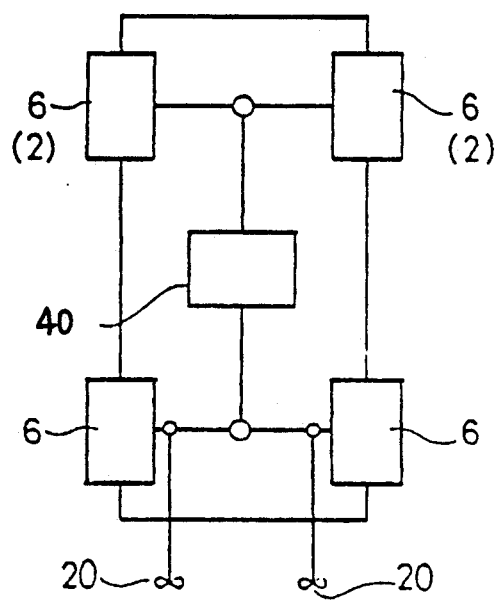
Figure 28:
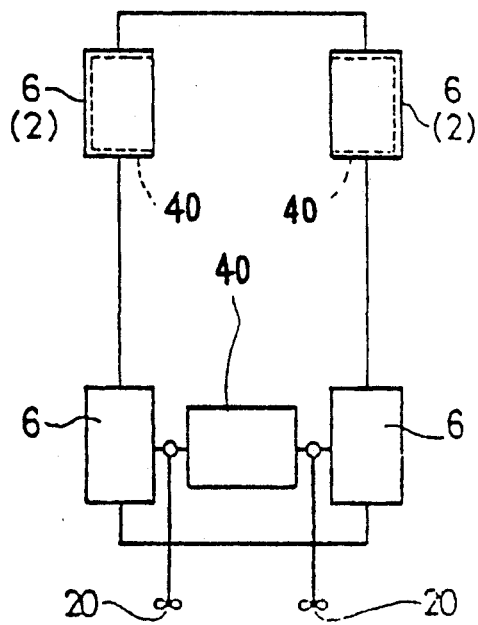

The embodiment shown in FIG. 27 differs from the embodiment shown in FIG. 25 only in that one driving-force generating means 40 is disposed in common for the front wheels 2 and the rear wheels 3, and the other arrangements are the same. In addition, the embodiment shown in FIG. 28 differs from the embodiment shown in FIG. 25 only in that the driving-force generating means 40 for the front wheels 2 are disposed independently, and the other arrangements are the same.

The above-described examples arrangements for the driving force generating means and the propelling-force generating means are just a small number of examples, and it goes without saying that various other arrangements are conceivable in addition to them.

In addition, although in the foregoing embodiments a description has been given of a case where the wheels 2 are supported in contact with the road surface as a means for supporting the chassis of the vehicle 1 with respect to the road surface, vehicle 1 may be made to air float. A description will be given of embodiments in which the vehicle 1 is made to float.

Figure 29:
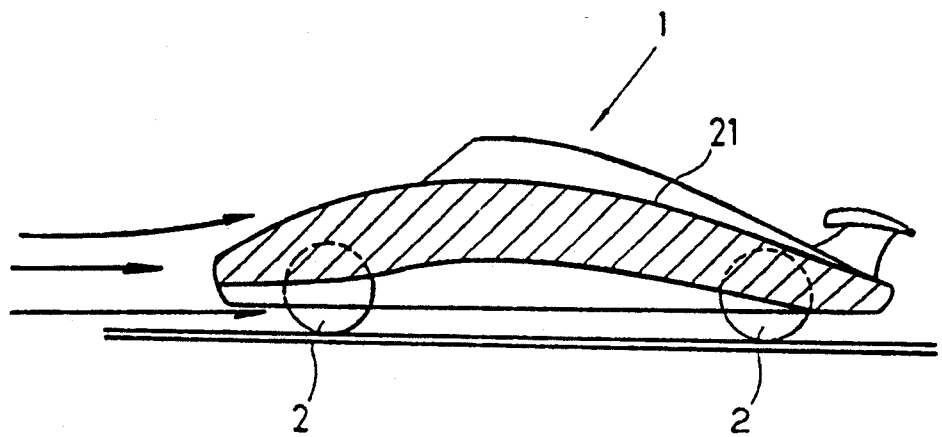
FIG. 29 is a diagram illustrating an embodiment of an air floating vehicle.

FIG. 29 is a diagram illustrating an embodiment of an air floating vehicle. A wing 21 is provided on the chassis 1, and buoyancy is produced by allowing by the collision of air having relative movement against this wing 21 so as to cause the chassis to float. In the case where the chassis is made to float in this manner, frictional drive is not provided, and propelling drive derived from magnetic induction, or auxiliary propelling drive using propellers is added. In this case, it is necessary to support the chassis in contact with the road surface by means of the tires 2 until buoyancy sufficient to allow the chassis to float by means of the relative movement of air is produced. It should be noted that magnetic suspension or the like may be employed as a means of supporting the chassis in a state of noncontact.

In the case where running is effected with the chassis floating, a degree of freedom is imparted in all directions, but it is impossible to effect free steering in the manner of the ground-contacting wheels. In addition, in order to run above the reaction plates, guidance along the reaction plates becomes necessary. The guide 5 and the guide rollers 3 shown in FIG. 1 are designed to provide such guidance, and embodiments thereof will be described hereinunder.

Figure 30:
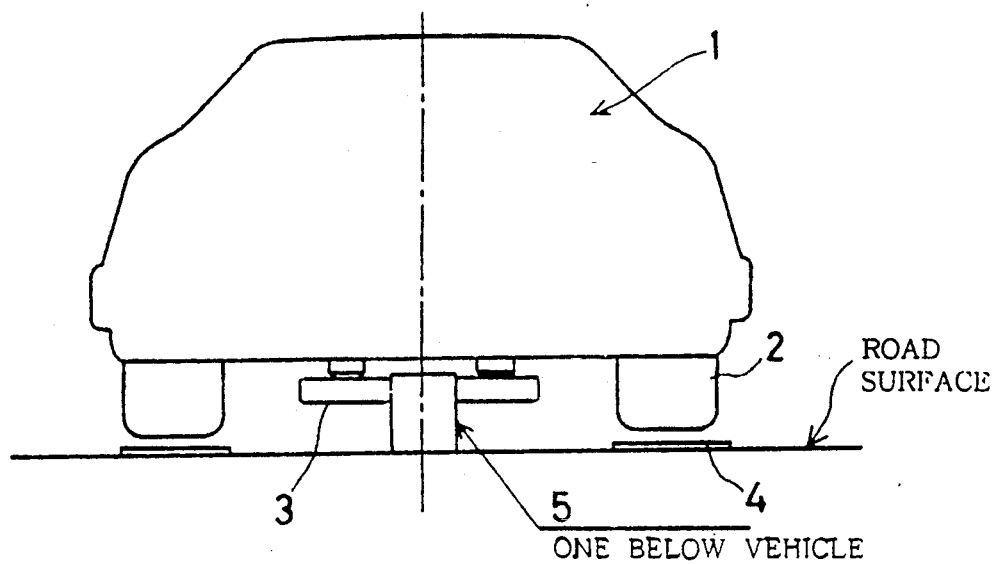
FIG. 30 is a diagram illustrating an example of positions at which a guide and guide rollers are set.
Figure 31A:
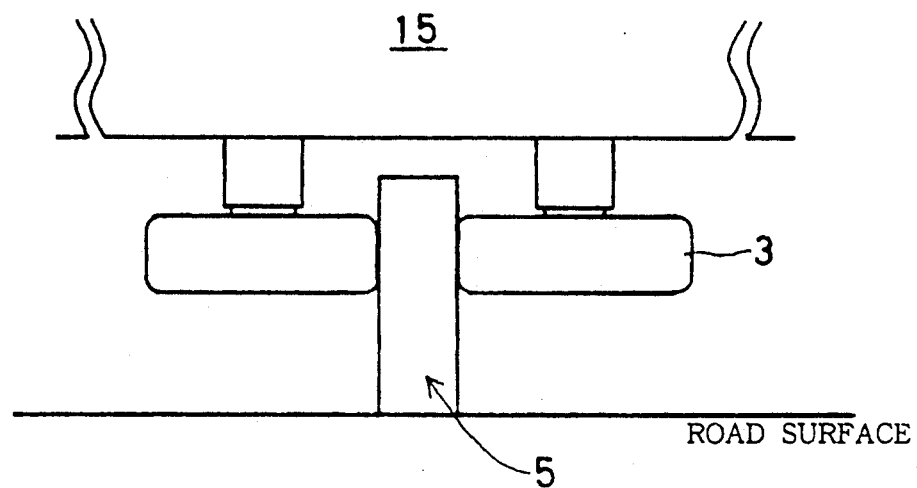
FIGS. 31(a) and 31(b) are enlarged views of the guide and guide rollers shown in FIG. 30.

FIG. 30 is a diagram illustrating an example of positions at which the guide and the guide rollers are set; FIG. 31 is an enlarged view of the guide and the guide rollers shown in FIG. 30; and FIGS. 32 to 34 are diagrams illustrating other examples of the positions at which the guides and guide rollers are set.

Figure 31B:
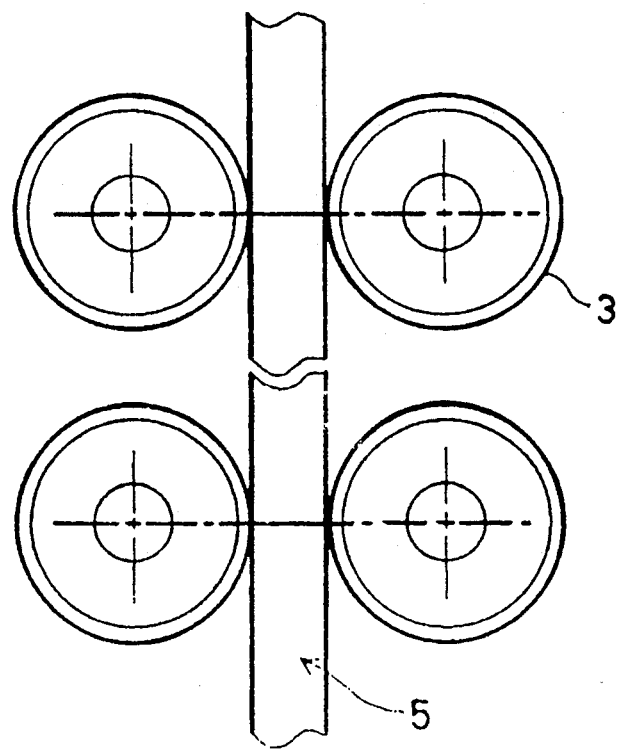

In the embodiment shown in FIG. 30, one guide 5 is laid at the center of the road surface, and the chassis 15 is supported by clamping the guide 5 by the guide rollers 3 attached to the chassis 15, the view being taken from the front or rear of the vehicle. Basically, as shown in the plan view of FIG. 31(a), stability is secured by providing two sets of guide rollers 3 for clamping the guide 5 from both sides thereof to support the chassis 15, and FIG. 31(b) shows a front elevational view thereof.

Figure 32:
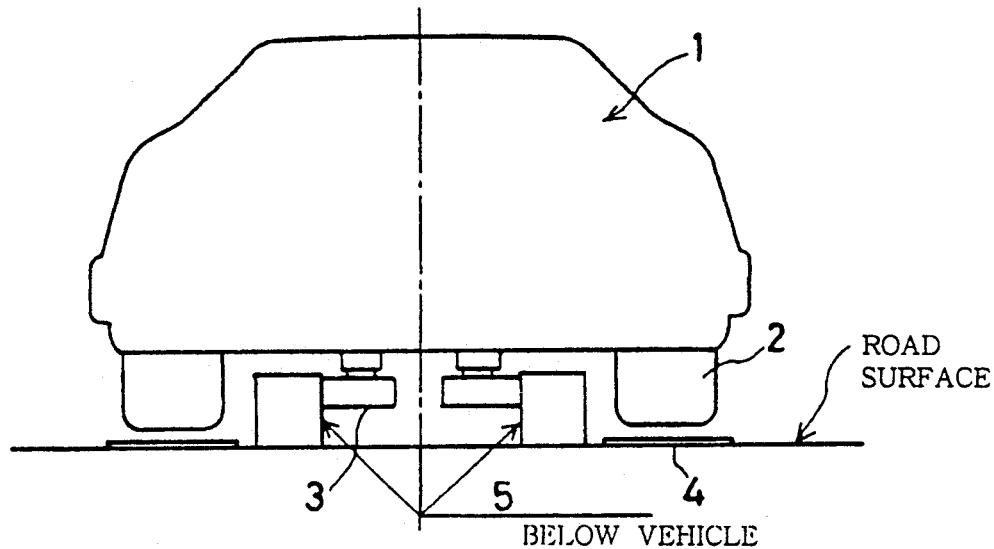
FIGS. 32 to 34 are diagrams illustrating other examples of the positions at which guides and guide rollers are set.
Figure 33:
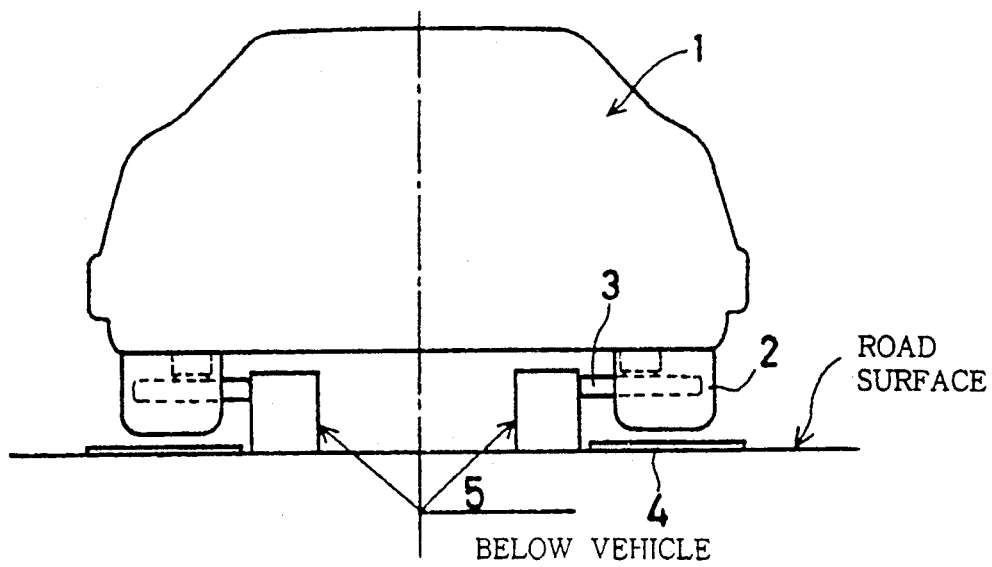

The embodiment shown in FIG. 32 is arranged such that two guides 5 are laid at an interval narrower than the transverse distance between the wheels 2, and the guide rollers 3 attached to the chassis 15 abut against the guides from the inner sides thereof. In contrast, the embodiment shown in FIG. 33 is arranged such that the guide rollers 3 attached to the chassis 15 abut against the guides 5 from the outer sides thereof. In other words, in the embodiments shown in FIGS. 32 and 33, running is effected in such a manner that the wheels 2 straddle the guides 5 in a manner similar to that shown in FIG. 30. The difference between FIGS. 30 and 32 lies in the difference between one guide 5 at the center or two guides 5 on the outer sides of the guide rollers 3, and a vehicle having the same arrangement of the guide rollers 3 can be used with both.

Figure 34:
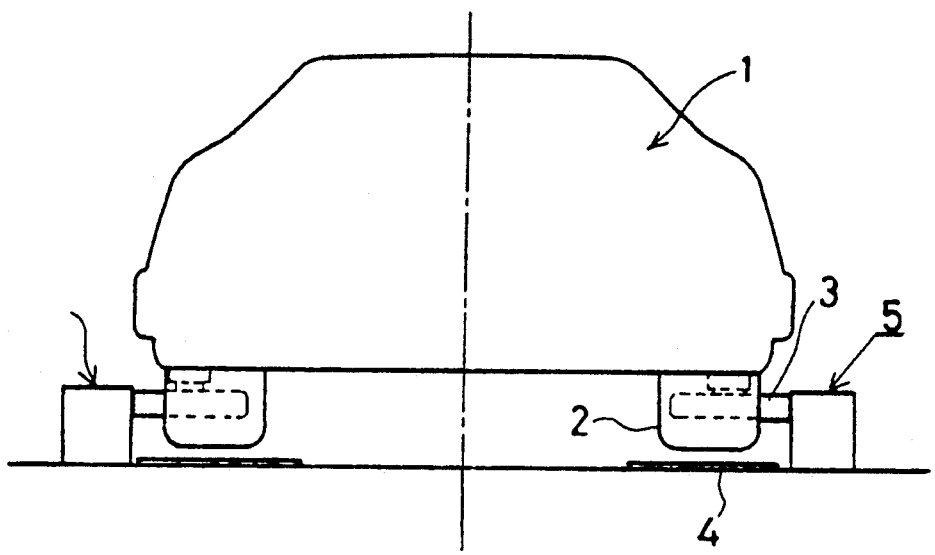
Figure 35:
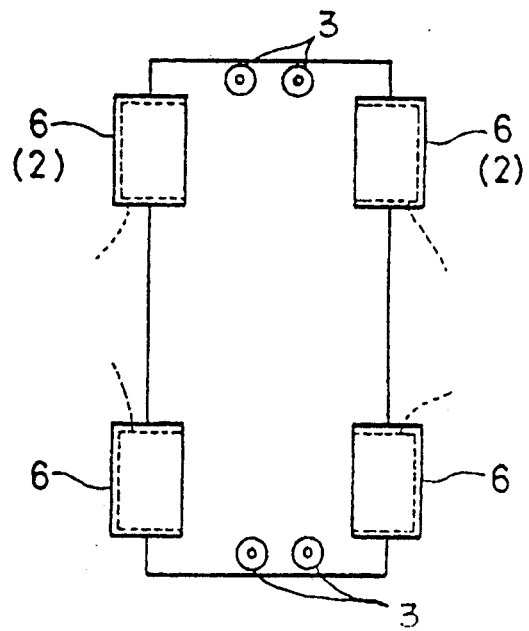
FIGS. 35 to 39 are diagrams illustrating embodiments corresponding to the cases of the four-wheeled vehicle shown in FIGS. 17 to 21.
Figure 36:
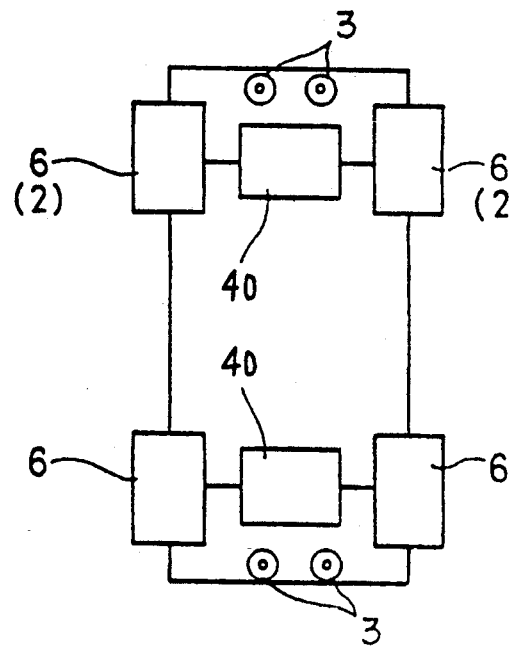
Figure 37:
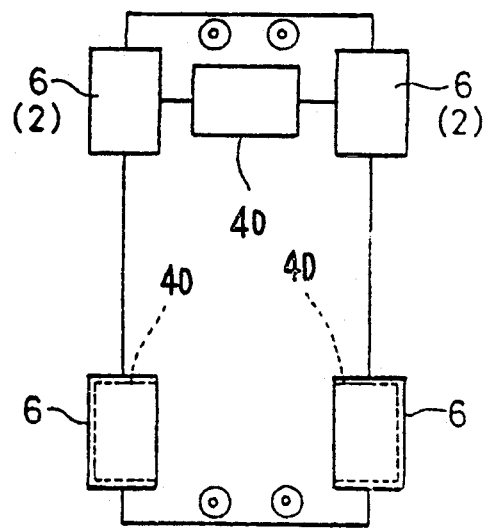
Figure 38:
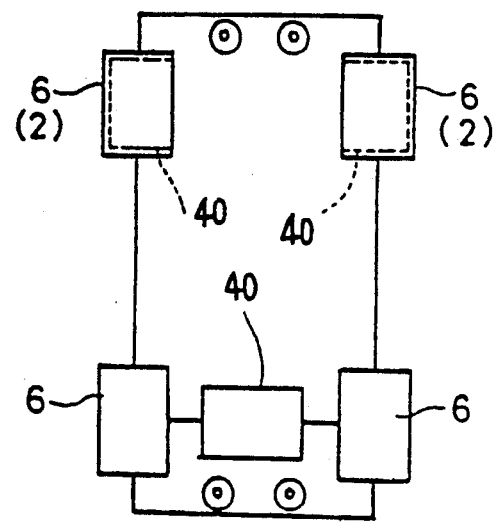
Figure 39:
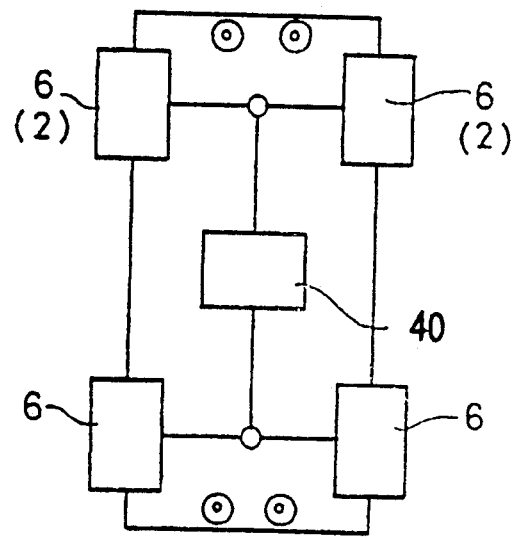

The embodiment shown in FIG. 34 has two guide rollers 5 separated by a distance wider than the transverse distance between the wheels 2, and the guide rollers 3 attached to the chassis 15 abut against the guides 5 from the inner sides thereof. Thus the vehicle 1 runs along the inner sides of the two guides 5.

Next, a description will be given of examples of the arrangement of the guide rollers corresponding to the arrangement of the driving-force generating means and the propelling-force generating means described earlier.

FIGS. 35 to 39 are diagrams illustrating embodiments corresponding to the cases of the four-wheeled vehicle shown in FIGS. 17 to 21, and the embodiments shown in FIGS. 30 to 33 are applied thereto. That is, two pairs of guide rollers 3 are disposed on the inner sides of the wheels 2, the pairs being provided for the front and the rear wheels, respectively. It goes without saying that the embodiment shown in FIG. 34 is also applicable to these embodiments.

Figure 40:
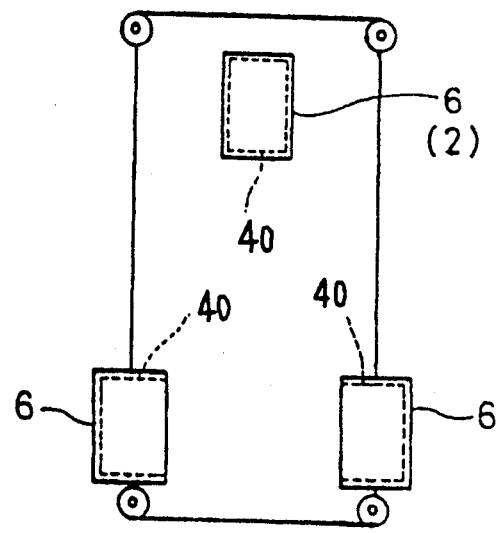
FIGS. 40 to 42 are diagrams illustrating embodiments corresponding to the cases of the three-wheeled vehicle shown in FIGS. 22 to 24.
Figure 41:
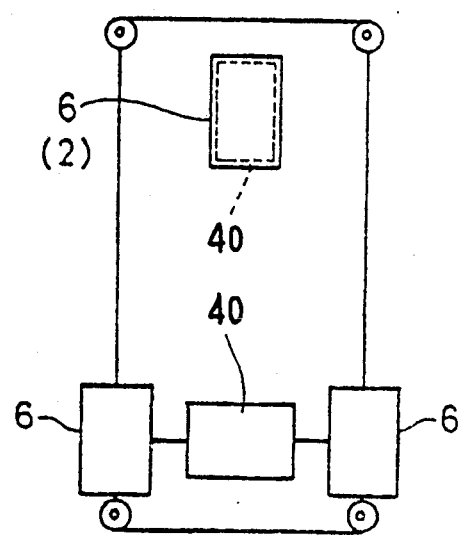
Figure 42:
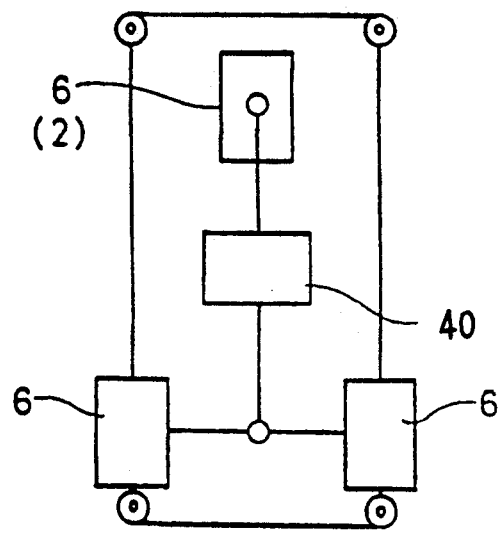
Figure 43:
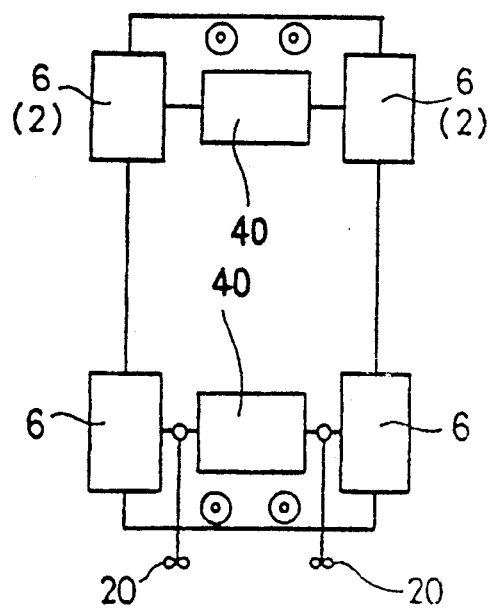
FIGS. 43 to 46 are diagrams illustrating embodiments corresponding to the cases in which the additional propelling-force generating means shown in FIGS. 25 to 28 are combined.
Figure 44:
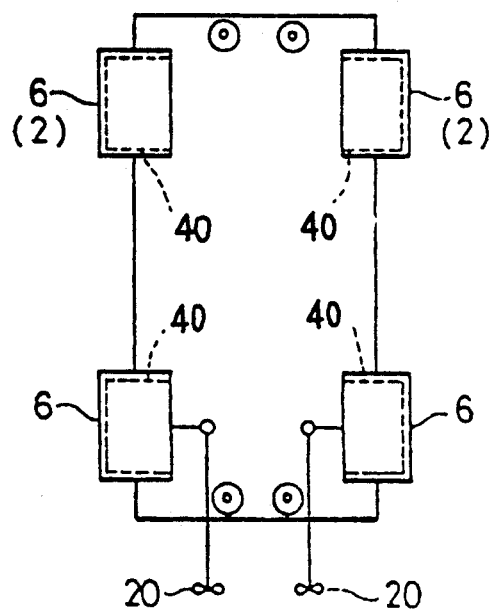
Figure 45:
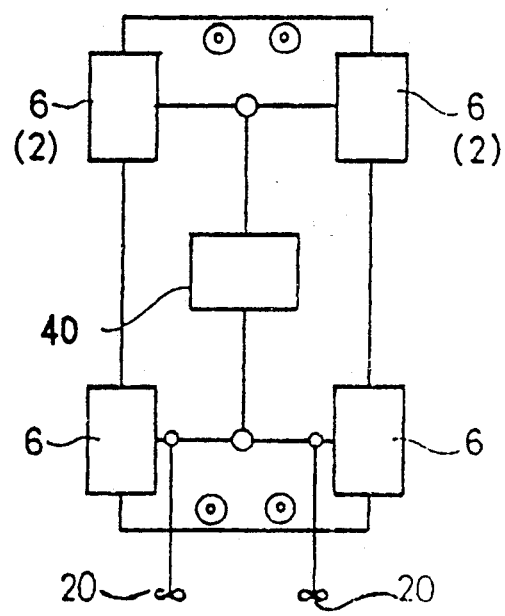
Figure 46:
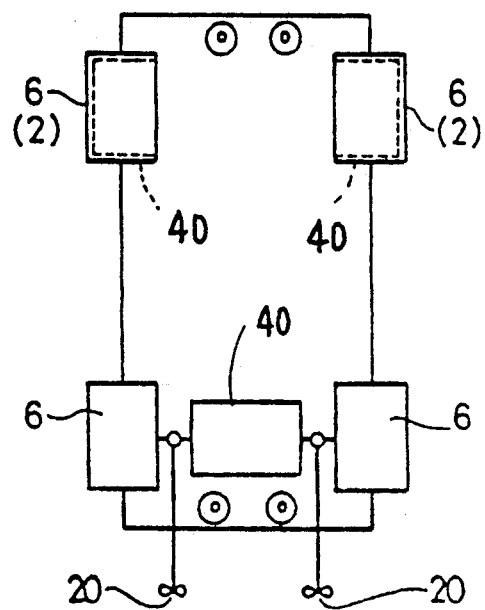

FIGS. 40 to 42 are diagrams illustrating embodiments corresponding to the cases of the three-wheeled vehicle shown in FIGS. 22 to 24, and the embodiment shown in FIG. 34 is applied thereto. In the case of the three-wheeled vehicle, since one wheel is present at the center as is apparent from its structure, the embodiment shown in FIG. 30 is not applicable, and FIG. 34 in which two guides 5 are laid on the opposite outer sides of the vehicle is easiest to apply. The arrangements shown in FIGS. 32 and 33 are also applicable, but the distance between the two guides 5 needs to be large enough not to constitute a hindrance to the wheel at the center.

FIGS. 43 to 46 are diagrams illustrating embodiments corresponding to the cases in which the additional propelling-force generating means shown in FIGS. 25 to 28 are combined. In the same way as the embodiments shown in FIGS. 35 to 39, two pairs of guide rollers 3 are disposed on the inner sides of the wheels 2, the pairs being provided for the front and the rear wheels, respectively. It goes without saying that the embodiment shown in FIG. 34 is also applicable to these embodiments.

Figure 47:
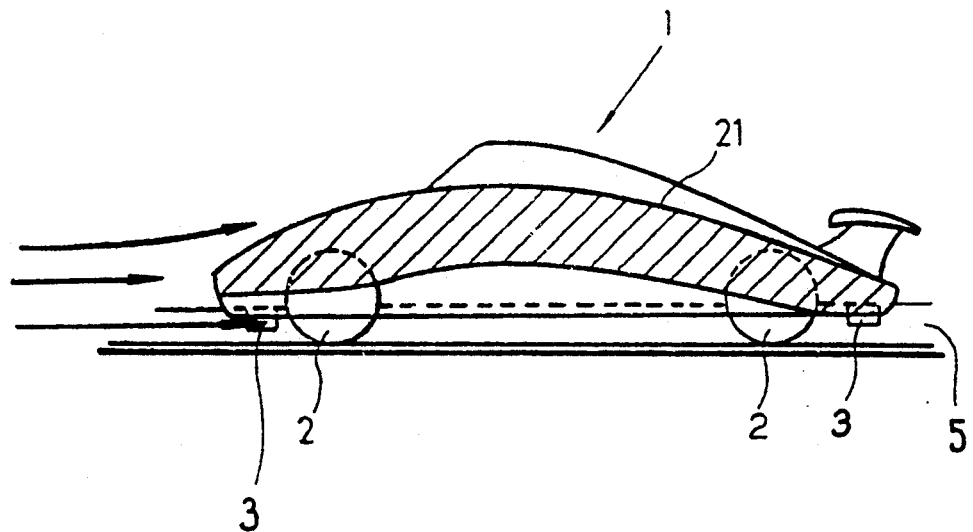
FIG. 47 is a diagram illustrating an embodiment in which the guide 5 and the guide rollers 3 are applied to the air floating vehicle shown in FIG. 29.
Figure 48:
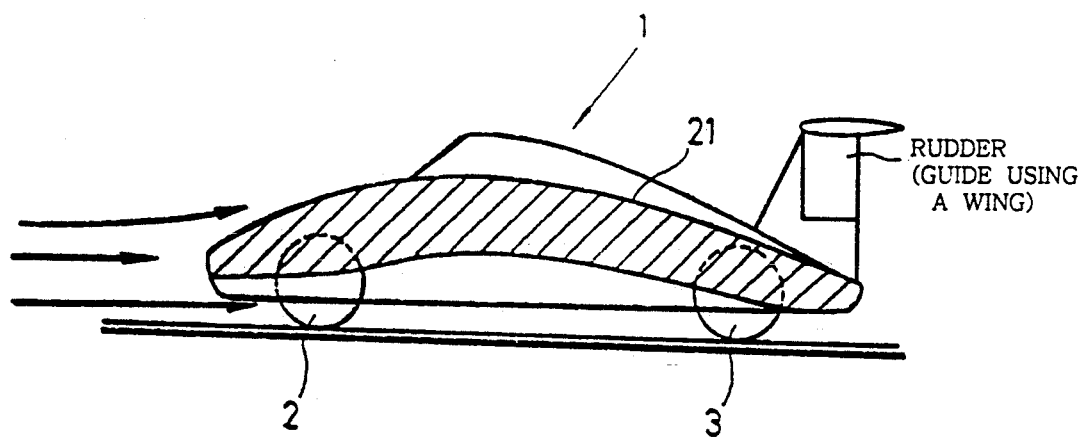
FIG. 48 is a diagram illustrating another embodiment in which the direction of travel of the air floating vehicle shown in FIG. 29 is guided.

FIG. 47 is a diagram illustrating an embodiment in which the guide 5 and the guide rollers 3 are applied to the air floating vehicle shown in FIG. 29, and the arrangements shown in FIGS. 30 to 34 can be applied thereto. Meanwhile, FIG. 48 is a diagram illustrating another embodiment in which the direction of travel of the air floating vehicle shown in FIG. 29 is guided, and a rudder 22 is mounted on a rear portion of the vehicle to guide the direction of travel of the vehicle 1.

Although in the foregoing embodiments a description has been given of the mechanism for guiding the direction of running in the case where running is effected by causing the vehicle to float by means of air or magnetism, running may be effected without causing the tires to come into contact with the reaction plates. A description will be given hereinunder of an embodiment of such a case.

Figure 49A:
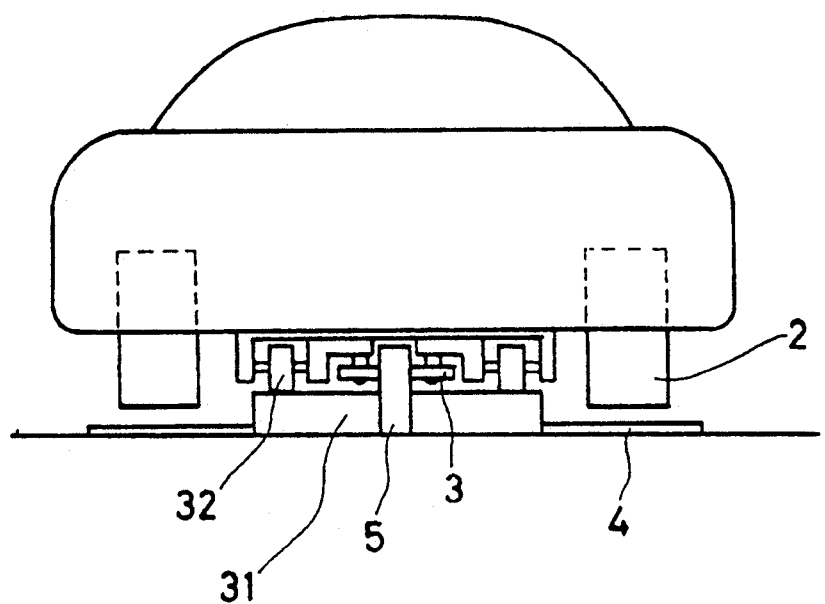
FIGS. 49(a) and 49(b) are diagrams illustrating an embodiment in which the tires are held in noncontact with the reaction plates by using carrying rails.
Figure 49B:
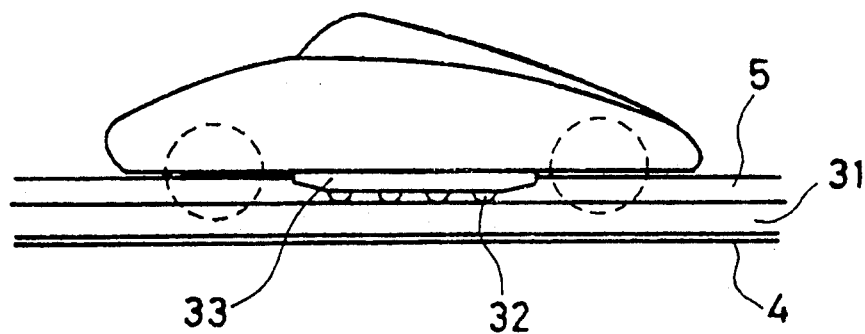

FIGS. 49(a) and 49(b) are diagrams illustrating an embodiment in which the tires are held in noncontact with the reaction plates by using carrying rails, and FIG. 50 is a diagram illustrating an example of how the guide rollers and the carriage rollers are attached.

In FIGS. 49(a) and 49(b), a pair of carrying rails 31 are each disposed between the reaction plates 4 which in turn are positioned below the wheels 2 on the road surface, with the guide 5 laid at the center. A pair of a carriage rollers are attached to the chassis 15 and support the overall vehicle on the carrying rails 31. A fixed gap is secured between each wheel 2 and the reaction plate 4 by virtue of support by the carriage rollers 32. A carriage 33 is used to mount the carriage rollers 32 and the guide rollers 3 integrally thereon so as to be fixed to the chassis 15. FIGS. 50(a) to 50(f) show a detailed example of how the guide rollers and the carriage rollers are attached.

Figure 50B:
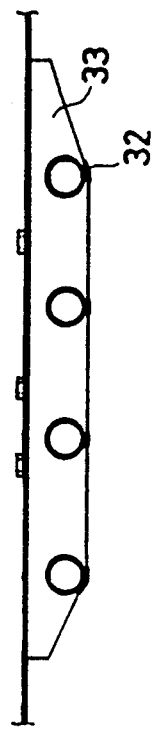
FIGS. 50(a) to 50(f) are diagrams illustrating a detailed example of how the guide rollers and the carriage rollers are attached; 50(a) is a bottom view of the roller assembly of the embodiment of FIG. 49.
Figure 50A:
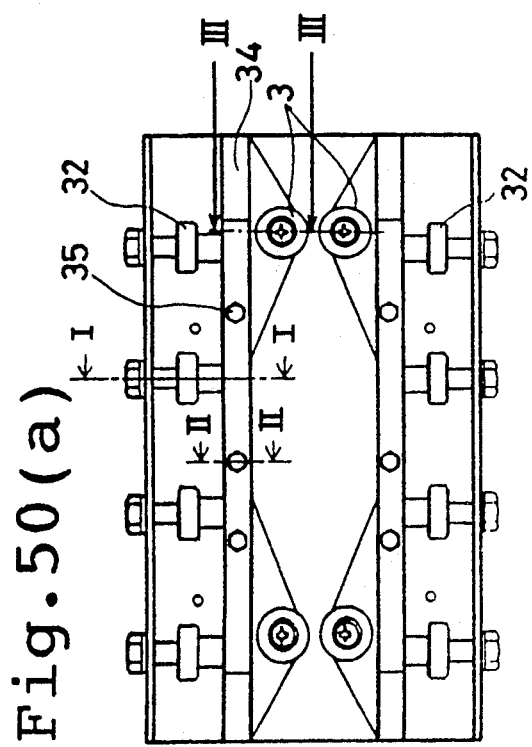
Figure 50C:
Figures 50D, 50E, 50F:
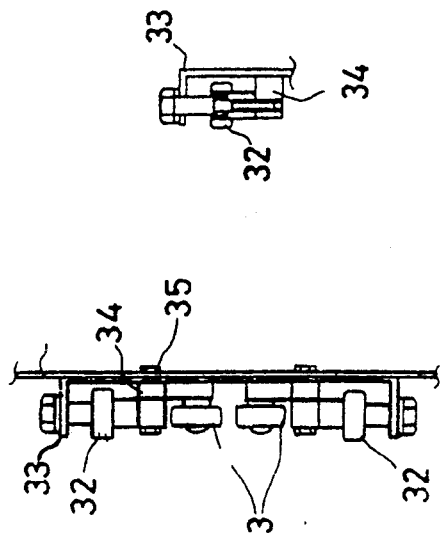

As illustrated in the rear bottom view shown in FIG. 50(a), a side elevational view shown in FIG. 50(b), and a rear or front view shown in FIG. 50(c), the carriage 33 is arranged such that a pair of attaching members 34 are secured to a panel whose sides are bent, and the guide rollers 3 and the carriage rollers 32 are attached to the panel with the attaching member 34 placed therebetween. As shown in FIG. 50(e), the carriage assembly is secured to the chassis by means of bolts 35 together with the attaching members 34. In this embodiment, a total of eight carriage rollers 32 for supporting the entire vehicle are provided, i.e., four carriage rollers on each side, and two pairs of guide rollers, i.e., a total of four guide rollers, are provided.

A description will now be given of the action of eddy currents acting in the reaction plate.

Figure 51A:
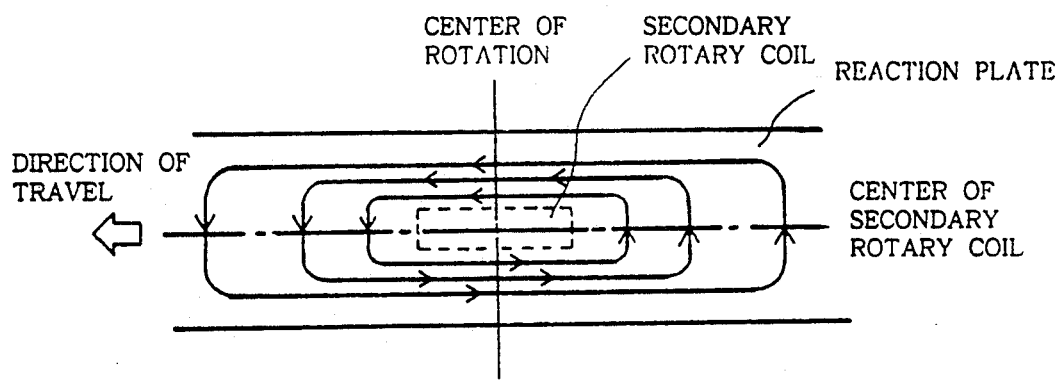
FIGS. 51(a) and 51(b) are diagrams illustrating examples of an eddy current pattern in the reaction plate.
Figure 51B:
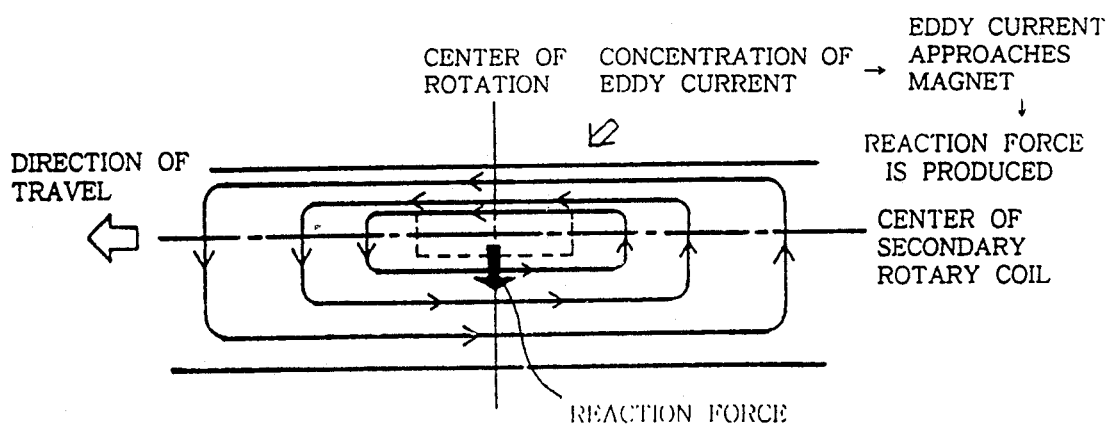

FIGS. 51(a) and 51(b) are diagrams illustrating examples of an eddy current pattern in the reaction plate. FIG. 51(a) is an example of the eddy current pattern in a case there the position of the secondary-side rotary magnet 7 is at the center of the reaction plate 4. FIG. 51(b) is an example of the eddy current pattern in a case where the position of the secondary-side rotary magnet 7 is offset from the center of the reaction plate 4. In the latter case, since the eddy current density is greatest at the upper side in the drawing, a reactionary force which is greater than the force acting on the opposite side (lower side in the drawing) tending to restore the position of the secondary-side rotary magnet 7 toward the center of the reaction plate 4 acts on the secondary-side rotary magnet 7. Accordingly, the restoring force acts between the reaction plate 4 and the secondary-side rotary magnet 7 in such a manner as to cause the tires to run at the center of the reaction plate 4 in the direction of running.

Figure 52A:
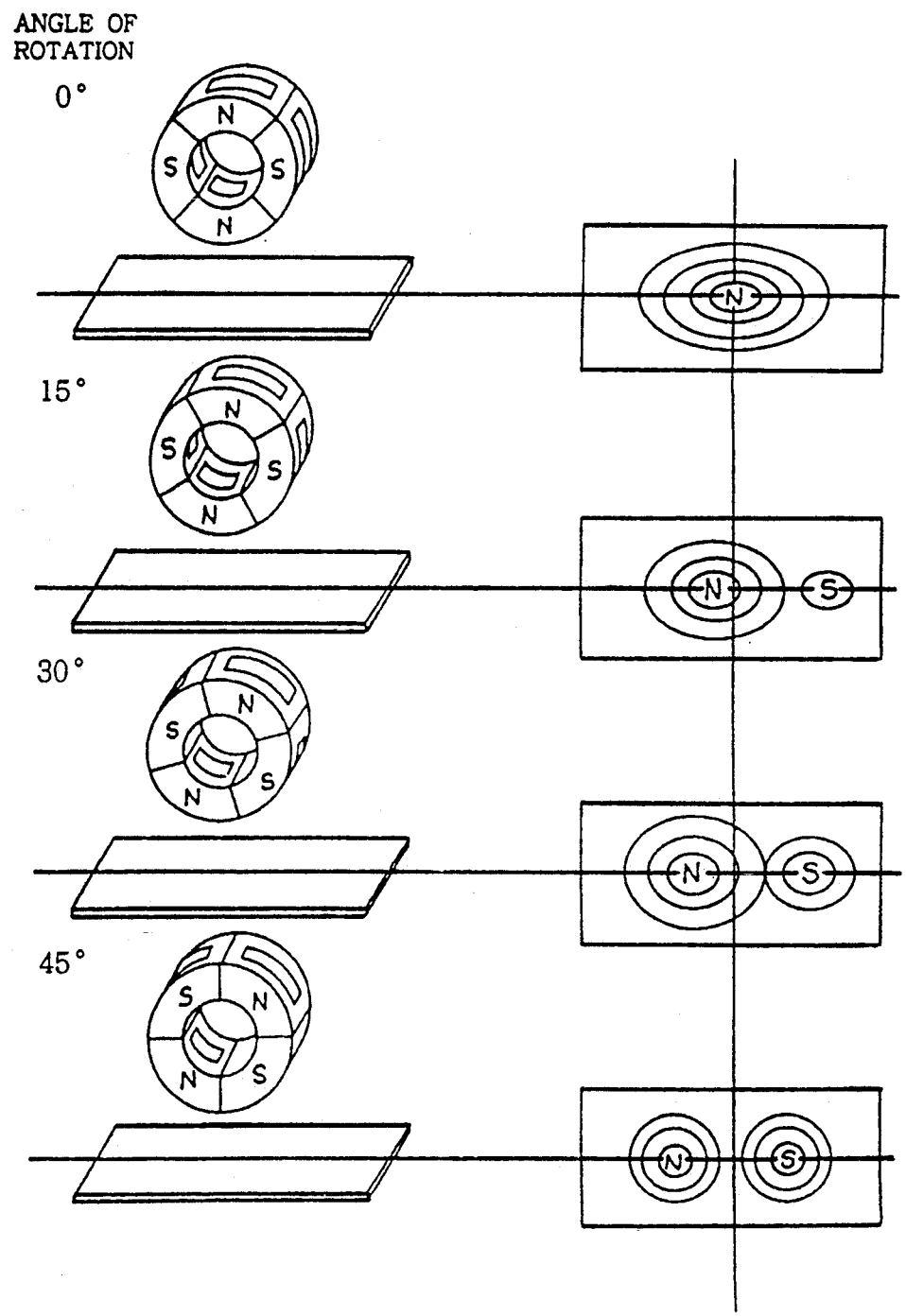
FIG. 52A is a diagram illustrating other examples of the eddy current pattern in the reaction plate.
Figure 52B:
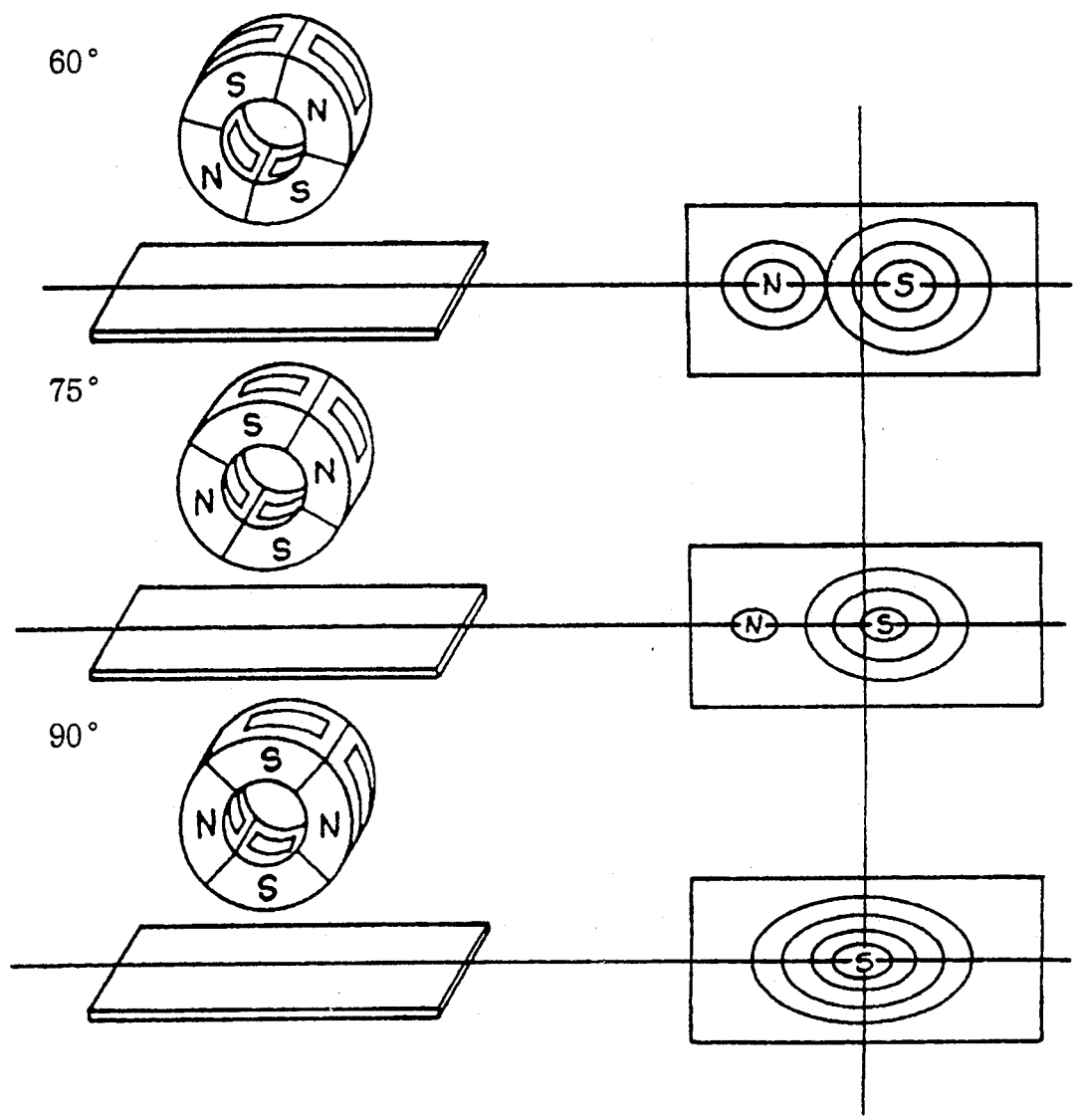
FIG. 52B is a diagram illustrating still additional examples of the eddy current pattern in the reaction plate.
Figure 52C:
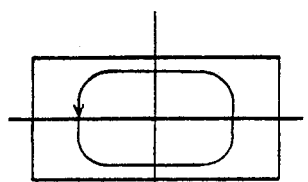
FIG. 52C is a diagram illustrating changes in the eddy current in the reaction plate.
Figure 52C:
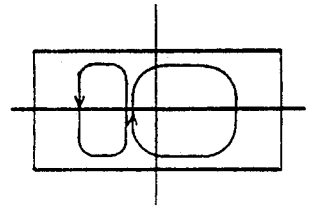
Figure 52C:
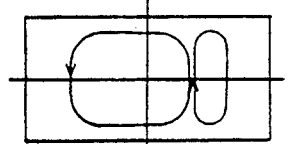
Figure 52C:
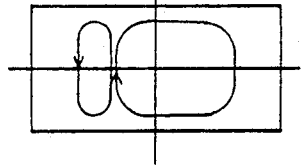
Figure 52C:
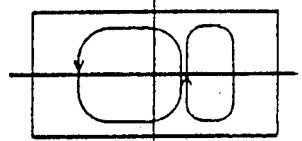
Figure 52C:
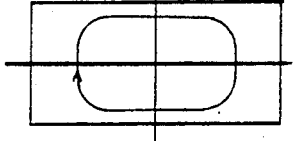
Figure 52C:
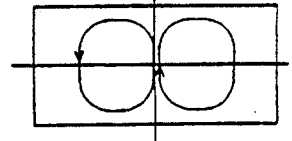

FIGS. 52A and 52B are diagrams illustrating examples of the angle of the secondary-side rotary magnet and the magnetic flux density in the reaction plate, and FIG. 52C is a diagram illustrating a change in the eddy current in the reaction plate.

The eddy current pattern in the reaction plate undergoes change as the angle of the secondary-side rotary magnet changes by each 15°, e.g., 0°, 15°, 30°, . . . , as shown in FIGS. 52A and 52B. Accordingly, if the secondary-side rotary magnet rotates, the eddy current pattern in the reaction plate consecutively changes as shown in diagrams (a), (b), (c), (d), (e), (f), and (g) in FIG. 52C in that order.

It should be noted that the present invention is not restricted to the forgoing embodiments, and various modifications are possible. For instance, although in the above-described embodiments a description has been given of the arrangement in which a pair of reaction plates are disposed on the road surface opposing the secondary-side rotary magnets, an arrangement may be alternatively provided such that each reaction plate may be divided or grooves are provided therein so as to control the pattern of the eddy current. By virtue of such a measure, it is possible to change the eddy current density due to the running position and improve the running performance. In addition, in a curved course, the reaction plate on the outer wheel side may be inclined in such a manner as to be raised relatively higher than the reaction plate on the inner wheel side.

As is apparent from the above description, in accordance with the present invention, since running is effected through propelling drive in noncontact with the road surface without resorting to frictional drive, it is possible to obtain a large driving force even on the road surface of a low μ road or the like. Moreover, with reaction plates laid on the road surface, it is possible to effect positive and stable running on any road surface without being affected by the road surface environment. In addition, since the running of the vehicle is not based on the frictional drive through friction between the wheels and the road surface, even if wheels are adopted as a means of holding the chassis on the road surface, the wheels practically do not undergo wear, and it is possible to attain high-speed running.

In addition, since the vehicle of the present invention is capable of running by frictional drive through friction between the wheels and the road surface and of running by propelling drive in noncontact with the road surface, it is possible to obtain a large driving force even on the road surface of a low μ road or the like. The vehicle is capable of running positively and stably on any road surface with the reaction plates without being affected by the road surface environment, and of running even on a road surface where the reaction plates are not laid.

Furthermore, since the propelling-force generating means is comprised of the rotary magnet, and the rotary magnet is comprised of the rotor of the electric motor for driving the rotary magnet, the driving devices of the vehicle can be made compact in size.

Additionally, by simply effecting the changeover control of the supply current to the fixed magnets, it is possible to obtain the noncontact propelling driving force, making it possible to make the driving device compact.

Moreover, the second driving-force generating means is comprised of an electric motor or engine constituting the first driving-force generating means, and since the rotary magnets and the wheels are rotated by the electric motors or the engine, the vehicle can be made compact in size.

In a transportation system using the vehicle with a noncontact drive mechanism, it is possible to realize a transportation system in which the vehicle is capable of running positively and stably on any road surface without being affected by the road surface environment, with relatively simple facilities involving the laying of reaction plates and a guide and carrying rails for controlling the running direction. In addition, since running is based on noncontact drive, it is possible to effect high-speed running.

What is claimed is:

1. A vehicle having a chassis and a noncontact drive mechanism, said noncontact drive mechanism comprising:
   magnetic propelling means for propelling the vehicle along a road surface by magnetic induction of an eddy current within a reaction plate laid on the road surface, said magnetic propelling means being mounted on said vehicle, separated from contact with said reaction plate;
   chassis supporting means for supporting the chassis with respect to the road surface; and
   running-direction control means for controlling the direction of running of said vehicle;
   a plurality of wheels for supporting said chassis on the road surface; and
   said magnetic propelling means including:
      magnetism generating means, arranged symmetrically around a central axis, for generating magnetism; and
      magnetism control means for changing said generated magnetism acting on said reaction plate and for driving at least one of said wheels;
   said axis of said magnetism generating means being at approximately a right angle to said direction of running to cause said magnetism to be changed along said direction of running;
   whereby the vehicle may be propelled by magnetic force in noncontact with said reaction plate and by frictional force through friction between the road surface and said wheels.

2. A vehicle with a noncontact drive mechanism according to claim 1, wherein said magnetism generating means comprises a rotary magnet, and said magnetism control means is means for rotatably driving said rotary magnet.

3. A vehicle with a noncontact drive mechanism according to claim 2, wherein said magnetism control means is an electric motor.

4. A vehicle with a noncontact drive mechanism according to claim 3, wherein said rotary magnet is a rotor of said electric motor.

5. A vehicle with a noncontact drive mechanism according to claim 2, wherein said magnetism control means is an engine.

6. A vehicle with a noncontact drive mechanism according to claim 2, wherein said rotary magnet is integrally mounted within one of said wheels and wherein said electric motor comprises a primary-side armature fixed to the chassis.

7. A vehicle with a noncontact drive mechanism according to claim 1, wherein said chassis supporting means is suspending means for floating said chassis above the road surface.

8. A vehicle with a noncontact drive mechanism according to claim 7, wherein said suspending means is means for floating said chassis on air.

9. A vehicle with a noncontact drive mechanism according to claim 7, wherein said suspending means is means for floating said chassis by means of magnetic force.

10. A vehicle with a noncontact drive mechanism according to claim 1, further comprising an additional propelling-force generating means.

11. A vehicle with a noncontact drive mechanism according to claim 10, wherein said additional propelling-force generating means is a propeller.

12. A vehicle with a noncontact drive mechanism according to claim 1, wherein said rotary magnet is integral with said wheel.

13. A vehicle with a noncontact drive mechanism according to claim 1, wherein said magnetic propelling means comprises a fixed magnet mounted on said chassis, and said flux control means changes the magnetism of said fixed magnet by controlling supply of current to said fixed magnet.

14. A vehicle with a noncontact drive mechanism according to claim 1, wherein said chassis supporting means is a carriage roller for supporting said chassis on a rail laid on the road surface.

15. A vehicle with a noncontact drive mechanism according to claim 1, wherein said running-direction control means is a guide roller for abutting against a guide laid on the road surface.

16. A vehicle with a noncontact drive mechanism according to claim 1, wherein said running-direction control means is a rudder in the form of a wing mounted on said chassis.

17. A vehicle with a noncontact drive mechanism according to claim 1, wherein said running-direction control means utilizes reaction forces on said magnetic propelling means when the direction of running deviates from a proper course.

18. A transportation system using a vehicle with a chassis and a noncontact drive mechanism, comprising:

a reaction plate laid on a road surface; and a vehicle with a noncontact drive mechanism including:

- magnetic propelling means for propelling the vehicle along the road surface by magnetic induction of an eddy current within said reaction plate, said magnetic propelling means being mounted on said vehicle, separated from contact with said reaction plate,
- chassis supporting means for supporting the chassis with respect to the road surface; and
- running-direction control means for controlling the direction of running of said vehicle;
- a plurality of wheels for supporting said chassis on the road surface;

said magnetic propelling means including:

- magnetism generating means, arranged symmetrically around a central axis, for generating magnetism;
- magnetism control means for changing said generated magnetism acting on said reaction plate and for driving at least one of said wheels,
- said axis of said magnetism generating means being at approximately a right angle to said direction of running to cause said magnetism to be changed along said direction of running.

19. A transportation system using a vehicle with a noncontact drive mechanism according to claim 18, wherein said reaction plate is divided into parallel tracks.

20. A transportation system using a vehicle with a noncontact drive mechanism according to claim 18, wherein said running-direction control means comprises a guide roller and a guide, against which said guide roller abuts, laid on the road surface.

21. A transportation system using a vehicle with a noncontact drive mechanism according to claim 18, wherein said chassis supporting means comprises a carriage roller and a carrying rail, on which said carriage roller travels, laid on the road surface.

* * * * *

UNITED STATES PATENT AND TRADEMARK OFFICE
CERTIFICATE OF CORRECTION

PATENT NO. : 5,263,419  Page 1 of 2
DATED : November 23, 1993
INVENTOR(S) : MOROTO et al It is certified that error appears in the above-indentified patent and that said Letters Patent is hereby corrected as shown below:

Col. 4, line 3, after "the", first instance, insert --supply--;

Col. 6, line 16, delete "and".

Col. 7, line 15, delete "magnetic induction" insert --on a--;
    line 45, before "changed" insert --mechanically-- and delete "me-";
    line 46, delete "chanically".

Col. 13, line 51, after "which" insert a comma --,--;
    line 52, after "in turn" insert a comma --,--.

UNITED STATES PATENT AND TRADEMARK OFFICE
CERTIFICATE OF CORRECTION

PATENT NO. : 5,263,419

DATED : November 23, 1993

INVENTOR(S) : Shuzo Moroto, et al.

It is certified that error appears in the above-identified patent and that said Letters Patent is hereby corrected as shown below:

Column 13, line 52, after "in turn " insert a comma --,--.

Signed and Sealed this

Thirtieth Day of August, 1994

Attest:

BRUCE LEHMAN

*Attesting Officer*    *Commissioner of Patents and Trademarks*